(12) United States Patent
Choudhury et al.

(10) Patent No.: US 10,802,766 B2
(45) Date of Patent: Oct. 13, 2020

(54) DATABASE WITH NVDIMM AS PERSISTENT STORAGE

(71) Applicant: Oracle International Corporation, Redwood Shores, CA (US)

(72) Inventors: Nilesh Choudhury, Foster City, CA (US); Kothanda Umamageswaran, Sunnyvale, CA (US); Krishnan Meiyyappan, Fremont, CA (US); Jia Shi, Burlingame, CA (US); Vijay Sridharan, Santa Clara, CA (US); Zuoyu Tao, Belmont, CA (US); Kai Zhang, Hayward, CA (US); Semen Ustimenko, Sunnyvale, CA (US); Salini Selvaraj Kowsalya, Oakland, CA (US); Somayeh Sardashti, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 195 days.

(21) Appl. No.: 15/720,959

(22) Filed: Sep. 29, 2017

(65) Prior Publication Data

US 2019/0102113 A1 Apr. 4, 2019

(51) Int. Cl.
*G06F 16/23* (2019.01)
*G06F 3/06* (2006.01)
(Continued)

(52) U.S. Cl.
CPC .......... *G06F 3/0679* (2013.01); *G06F 3/061* (2013.01); *G06F 3/067* (2013.01); *G06F 3/0656* (2013.01);
(Continued)

(58) Field of Classification Search
None
See application file for complete search history.

(56) References Cited

U.S. PATENT DOCUMENTS 4,425,615 A 1/1984 Swenson et al.
4,881,166 A 11/1989 Thompson et al.
(Continued)

FOREIGN PATENT DOCUMENTS

EP 0 501 180 A 9/1992
GB 2409 301 A 6/2005
(Continued)

OTHER PUBLICATIONS

Lahiri, U.S. Appl. No. 14/709,018, filed May 11, 2015, Interview Summary, dated Jul. 3, 2019.
(Continued)

*Primary Examiner* — Wilson Lee
(74) *Attorney, Agent, or Firm* — Marcel K. Bingham; Hickman Palermo Becker Bingham LLP

(57) ABSTRACT

A shared storage architecture persistently stores database files in non-volatile random access memories (NVRAMs) of computing nodes of a multi-node DBMS. The computing nodes of the multi-node DBMS not only collectively store database data on NVRAMs of the computing nodes, but also host database server instances that process queries in parallel, host database sessions and database processes, and together manage access to a database stored on the NVRAMs of the computing nodes. To perform a data block read operation from persistent storage, a data block may be transferred directly over a network between NVRAM of a computing node that persistently stores the data block to a database buffer in non-volatile RAM of another computing node that requests the data block. The transfer is accomplished using remote direct memory access ("RDMA).

20 Claims, 14 Drawing Sheets

(51) Int. Cl.
*G06F 16/18* (2019.01)
*G06F 16/903* (2019.01)

(52) U.S. Cl.
CPC .......... *G06F 16/1847* (2019.01); *G06F 16/23* (2019.01); *G06F 16/90339* (2019.01)

(56) References Cited

U.S. PATENT DOCUMENTS

| | | |
|---|---|---|
| 5,095,421 A | 3/1992 | Freund |
| 5,241,675 A | 8/1993 | Sheth et al. |
| 5,263,156 A | 11/1993 | Bowen et al. |
| 5,287,496 A | 2/1994 | Chen et al. |
| 5,333,265 A | 7/1994 | Orimo et al. |
| 5,333,316 A | 7/1994 | Champagne et al. |
| 5,355,477 A | 10/1994 | Strickland et al. |
| 5,369,757 A | 11/1994 | Spiro et al. |
| 5,388,196 A | 2/1995 | Pajak et al. |
| 5,423,037 A | 6/1995 | Hvasshovd |
| 5,454,102 A | 9/1995 | Tang et al. |
| 5,553,279 A | 9/1996 | Goldring |
| 5,555,404 A | 9/1996 | Torbjørnsen et al. |
| 5,559,991 A | 9/1996 | Kanfi |
| 5,566,315 A | 10/1996 | Milillo et al. |
| 5,574,906 A | 11/1996 | Morris |
| 5,581,753 A | 12/1996 | Terry et al. |
| 5,603,024 A | 2/1997 | Goldring |
| 5,613,113 A | 3/1997 | Goldring |
| 5,649,156 A | 7/1997 | Vishlitzky et al. |
| 5,717,893 A | 2/1998 | Mattson |
| 5,774,643 A | 6/1998 | Lubbers |
| 5,806,076 A | 9/1998 | Ngai et al. |
| 5,870,758 A | 2/1999 | Bamford et al. |
| 5,870,761 A | 2/1999 | Demers et al. |
| 5,893,086 A | 4/1999 | Schmuck |
| 5,924,096 A | 7/1999 | Draper et al. |
| 5,943,689 A | 8/1999 | Tamer |
| 5,951,695 A | 9/1999 | Kolovson |
| 5,953,719 A | 9/1999 | Kleewein |
| 5,956,731 A | 9/1999 | Bamford et al. |
| 5,974,427 A | 10/1999 | Reiter |
| 5,983,277 A | 11/1999 | Heile et al. |
| 5,991,771 A | 11/1999 | Falls et al. |
| 6,014,669 A | 1/2000 | Slaughter et al. |
| 6,122,630 A | 9/2000 | Strickler et al. |
| 6,192,377 B1 | 2/2001 | Ganesh et al. |
| 6,298,319 B1 | 10/2001 | Heile et al. |
| 6,353,835 B1 | 3/2002 | Lieuwen |
| 6,370,622 B1 | 4/2002 | Chiou et al. |
| 6,393,485 B1 | 5/2002 | Chao et al. |
| 6,457,105 B1 | 9/2002 | Spencer et al. |
| 6,516,327 B1 | 2/2003 | Zondervan et al. |
| 6,526,483 B1 | 2/2003 | Cho et al. |
| 6,574,717 B1 | 6/2003 | Ngai et al. |
| 6,611,898 B1 | 8/2003 | Slattery et al. |
| 6,691,139 B2 | 2/2004 | Ganesh et al. |
| 6,728,823 B1 | 4/2004 | Walker et al. |
| 6,839,751 B1 | 1/2005 | Dietz et al. |
| 6,922,754 B2 | 7/2005 | Liu et al. |
| 7,024,656 B1 | 4/2006 | Ahad |
| 7,031,994 B2 | 4/2006 | Lao et al. |
| 7,069,324 B1 | 6/2006 | Tiwana et al. |
| 7,076,508 B2 | 7/2006 | Brourbonnais et al. |
| 7,159,076 B2 | 1/2007 | Madter |
| 7,165,144 B2 | 1/2007 | Choubal et al. |
| 7,222,136 B1 | 5/2007 | Brown et al. |
| 7,287,034 B2 | 10/2007 | Wong et al. |
| 7,290,017 B1 | 10/2007 | Wang et al. |
| 7,290,090 B2 | 10/2007 | Madter |
| 7,415,723 B2 | 8/2008 | Pandya |
| 7,461,147 B1 | 12/2008 | Mowat et al. |
| 7,464,113 B1 | 12/2008 | Girkar et al. |
| 7,496,589 B1 | 2/2009 | Jain et al. |
| 7,506,103 B2 | 3/2009 | Madter |
| 7,548,898 B1 | 6/2009 | Tarenskeen et al. |
| 7,558,290 B1 | 7/2009 | Nucci |
| 7,570,451 B2 | 8/2009 | Bedillion et al. |
| 7,627,612 B2 | 12/2009 | Ahal et al. |
| 7,636,814 B1 | 12/2009 | Karr et al. |
| 7,644,084 B2 | 1/2010 | Rapp |
| 7,660,945 B1 | 2/2010 | Lee |
| 7,693,886 B1 | 4/2010 | Novick |
| 7,725,559 B2 | 5/2010 | Landis |
| 7,769,802 B2 | 8/2010 | Smith |
| 7,774,568 B2 | 8/2010 | Sudhakar |
| 7,836,262 B2 | 11/2010 | Gunna et al. |
| 7,904,562 B2 | 3/2011 | Takase et al. |
| 7,912,051 B1 | 3/2011 | Rowlands et al. |
| 7,917,539 B1 | 3/2011 | Srinivasan |
| 7,921,686 B2 | 4/2011 | Bagepalli |
| 7,962,458 B2 | 6/2011 | Holenstein |
| 7,966,293 B1 | 6/2011 | Owara et al. |
| 8,145,838 B1 | 3/2012 | Miller et al. |
| 8,244,984 B1 | 8/2012 | Glasco et al. |
| 8,266,472 B2 | 9/2012 | Bose |
| 8,327,080 B1 | 12/2012 | Der |
| 8,359,429 B1 | 1/2013 | Sharma et al. |
| 8,370,452 B2 | 2/2013 | Harvell et al. |
| 8,566,297 B1 | 10/2013 | Dowers |
| 8,627,136 B2 | 1/2014 | Shankar |
| 8,683,139 B2 | 3/2014 | Gaither |
| 8,706,687 B2 | 4/2014 | Fineberg |
| 8,832,142 B2 | 9/2014 | Marwah et al. |
| 9,003,159 B2 | 4/2015 | Deshkar |
| 9,075,710 B2 | 7/2015 | Talagala |
| 9,164,702 B1 | 10/2015 | Nesbit et al. |
| 9,256,542 B1 | 2/2016 | Flower |
| 9,263,102 B2 | 2/2016 | Flynn |
| 9,292,564 B2 | 3/2016 | Kamp et al. |
| 9,471,586 B2 | 10/2016 | Patil et al. |
| 9,514,187 B2 | 12/2016 | Ziauddin |
| 10,148,548 B1 | 12/2018 | Griffin |
| 2002/0038384 A1 | 3/2002 | Khan |
| 2002/0059287 A1 | 5/2002 | Karasudani |
| 2002/0133508 A1 | 9/2002 | Larue et al. |
| 2002/0165724 A1 | 11/2002 | Bartus |
| 2003/0005223 A1 | 1/2003 | Coulson |
| 2003/0046298 A1 | 3/2003 | Weedon |
| 2003/0115324 A1 | 6/2003 | Blumenau |
| 2003/0217236 A1 | 11/2003 | Rowlands |
| 2004/0054860 A1 | 3/2004 | Dixit |
| 2004/0073754 A1 | 4/2004 | Cypher |
| 2004/0117441 A1 | 6/2004 | Liu et al. |
| 2004/0122910 A1 | 6/2004 | Douglass et al. |
| 2004/0148486 A1 | 7/2004 | Burton |
| 2004/0193574 A1 | 9/2004 | Suzuki |
| 2004/0199552 A1 | 10/2004 | Ward et al. |
| 2004/0225719 A1 | 11/2004 | Kisley et al. |
| 2004/0225720 A1 | 11/2004 | Pinkerton |
| 2004/0225845 A1 | 11/2004 | Kruckemyer et al. |
| 2004/0230753 A1 | 11/2004 | Amiri |
| 2004/0254943 A1 | 12/2004 | Malcolm |
| 2005/0132017 A1 | 6/2005 | Biran et al. |
| 2005/0160224 A1 | 7/2005 | Cuomo et al. |
| 2005/0193160 A1 | 9/2005 | Bhatte et al. |
| 2005/0198062 A1 | 9/2005 | Shapiro |
| 2005/0210202 A1 | 9/2005 | Choubal et al. |
| 2005/0251740 A1* | 11/2005 | Shur ................... G06F 17/217 715/251 |
| 2006/0004691 A1 | 1/2006 | Sifry |
| 2006/0010130 A1 | 1/2006 | Leff et al. |
| 2006/0064441 A1 | 3/2006 | Yamamoto |
| 2006/0106890 A1 | 5/2006 | Paul et al. |
| 2006/0146814 A1 | 7/2006 | Shah et al. |
| 2006/0149786 A1 | 7/2006 | Nishiyama |
| 2006/0209444 A1 | 9/2006 | Song |
| 2006/0212481 A1 | 9/2006 | Stacey et al. |
| 2006/0218123 A1 | 9/2006 | Chowdhuri et al. |
| 2006/0271605 A1 | 11/2006 | Petruzzo |
| 2006/0271740 A1 | 11/2006 | Mark |
| 2007/0038689 A1 | 2/2007 | Shinkai |
| 2007/0006757 A1 | 3/2007 | Morris et al. |
| 2007/0067575 A1 | 3/2007 | Morris et al. |
| 2007/0078914 A1 | 4/2007 | Correl |
| 2007/0078940 A1 | 4/2007 | Fineberg et al. |

(56) References Cited

U.S. PATENT DOCUMENTS

| | | |
|---|---|---|
| 2007/0083505 A1 | 4/2007 | Ferrari et al. |
| 2007/0226277 A1 | 9/2007 | Holenstein et al. |
| 2007/0239791 A1 | 10/2007 | Cattell |
| 2007/0260819 A1 | 11/2007 | Gao et al. |
| 2008/0016283 A1 | 1/2008 | Madter |
| 2008/0046736 A1 | 2/2008 | Arimilli et al. |
| 2008/0098044 A1 | 4/2008 | Todd |
| 2008/0104329 A1 | 5/2008 | Gaither et al. |
| 2008/0155303 A1 | 6/2008 | Toeroe |
| 2008/0177803 A1 | 7/2008 | Fineberg et al. |
| 2008/0209009 A1 | 8/2008 | Katwala et al. |
| 2008/0215580 A1 | 9/2008 | Altinel et al. |
| 2008/0219575 A1 | 9/2008 | Wittenstein |
| 2008/0222136 A1 | 9/2008 | Yates |
| 2008/0222159 A1 | 9/2008 | Aranha et al. |
| 2008/0235479 A1 | 9/2008 | Scales |
| 2008/0222111 A1 | 12/2008 | Hoang et al. |
| 2009/0030911 A1 | 1/2009 | Guo |
| 2009/0138944 A1 | 5/2009 | Rajasekaran |
| 2009/0164536 A1 | 6/2009 | Nasre et al. |
| 2009/0171679 A1 | 7/2009 | Salgado et al. |
| 2009/0182960 A1 | 7/2009 | Crockett |
| 2009/0193189 A1 | 7/2009 | Carswell et al. |
| 2009/0235230 A1 | 9/2009 | Lucas |
| 2009/0240664 A1 | 9/2009 | Dinker |
| 2009/0248871 A1 | 10/2009 | Takase et al. |
| 2009/0276479 A1 | 11/2009 | Lucas |
| 2009/0287737 A1 | 11/2009 | Hammerly |
| 2009/0292861 A1 | 11/2009 | Kanevsky |
| 2009/0313311 A1 | 12/2009 | Hoffmann |
| 2010/0017556 A1 | 1/2010 | Chin et al. |
| 2010/0036843 A1 | 2/2010 | MacNaughton et al. |
| 2010/0042587 A1 | 2/2010 | Johnson |
| 2010/0070448 A1 | 3/2010 | Omoigui |
| 2010/0095059 A1 | 4/2010 | Kisley et al. |
| 2010/0122026 A1 | 5/2010 | Umamageswaran et al. |
| 2010/0145909 A1 | 6/2010 | Ngo |
| 2010/0158486 A1 | 6/2010 | Moon |
| 2010/0199042 A1 | 8/2010 | Bates |
| 2010/0205367 A1 | 8/2010 | Ehrlich |
| 2010/0274962 A1 | 10/2010 | Moesk |
| 2010/0278446 A1 | 11/2010 | Ganesh et al. |
| 2010/0306234 A1 | 12/2010 | Wang et al. |
| 2010/0332654 A1 | 12/2010 | Bose |
| 2011/0022801 A1 | 1/2011 | Flynn |
| 2011/0029569 A1 | 2/2011 | Ganesh et al. |
| 2011/0040861 A1 | 2/2011 | Van der Merwe |
| 2011/0041006 A1 | 2/2011 | Flower |
| 2011/0047330 A1 | 2/2011 | Potapov |
| 2011/0071981 A1 | 3/2011 | Ghosh |
| 2011/0072217 A1 | 3/2011 | Hoang et al. |
| 2011/0087637 A1 | 4/2011 | Sundaram et al. |
| 2011/0093726 A1* | 4/2011 | Worthington ......... G06F 1/3225 713/320 |
| 2011/0145609 A1* | 6/2011 | Berard .................. G06F 1/3203 713/320 |
| 2011/0153719 A1 | 6/2011 | Santoro |
| 2011/0173325 A1 | 7/2011 | Cherian et al. |
| 2011/0191522 A1 | 8/2011 | Condict |
| 2011/0191543 A1 | 8/2011 | Craske et al. |
| 2011/0238899 A1 | 9/2011 | Yano |
| 2011/0258376 A1 | 10/2011 | Young |
| 2011/0320804 A1 | 12/2011 | Chan et al. |
| 2012/0013758 A1 | 1/2012 | Frederiksen |
| 2012/0017037 A1 | 1/2012 | Riddle |
| 2012/0054225 A1 | 3/2012 | Marwah |
| 2012/0054533 A1 | 3/2012 | Shi et al. |
| 2012/0063533 A1 | 3/2012 | Fonseka |
| 2012/0158650 A1 | 6/2012 | Andre |
| 2012/0158729 A1 | 6/2012 | Mital |
| 2012/0173844 A1 | 7/2012 | Punde et al. |
| 2012/0221788 A1 | 8/2012 | Raghunathan |
| 2012/0246202 A1 | 9/2012 | Surtani |
| 2012/0265743 A1 | 10/2012 | Ivanova |
| 2012/0296883 A1 | 11/2012 | Ganesh |
| 2012/0323849 A1 | 12/2012 | Garin et al. |
| 2012/0323970 A1 | 12/2012 | Larson |
| 2013/0007180 A1 | 1/2013 | Talpey et al. |
| 2013/0019000 A1 | 1/2013 | Markus |
| 2013/0024433 A1 | 1/2013 | Amit |
| 2013/0066949 A1 | 3/2013 | Colrain |
| 2013/0132684 A1 | 5/2013 | Ostrovsky |
| 2013/0132705 A1 | 5/2013 | Ishii |
| 2013/0166534 A1 | 6/2013 | Yoon |
| 2013/0166553 A1 | 6/2013 | Yoon |
| 2013/0198312 A1 | 8/2013 | Tamir et al. |
| 2013/0212332 A1 | 8/2013 | Umamageswaran |
| 2013/0275391 A1 | 10/2013 | Batwara |
| 2013/0290598 A1 | 10/2013 | Fiske |
| 2013/0326152 A1 | 12/2013 | Loaiza et al. |
| 2013/0339572 A1 | 12/2013 | Fanning et al. |
| 2014/0012814 A1 | 1/2014 | Bercovici |
| 2014/0047263 A1 | 2/2014 | Coathney |
| 2014/0089565 A1 | 3/2014 | Lee |
| 2014/0010842 A1 | 4/2014 | Isaacson |
| 2014/0108421 A1 | 4/2014 | Isaacson et al. |
| 2014/0108751 A1 | 4/2014 | Brown |
| 2014/0143364 A1 | 5/2014 | Guerin |
| 2014/0149638 A1 | 5/2014 | Jain |
| 2014/0200166 A1 | 7/2014 | Van Rooyen |
| 2014/0281167 A1 | 9/2014 | Danilak |
| 2014/0281272 A1 | 9/2014 | Loaiza et al. |
| 2014/0325115 A1 | 10/2014 | Ramsundar |
| 2014/0337593 A1 | 11/2014 | Holbrook |
| 2014/0372486 A1 | 12/2014 | Bose |
| 2014/0372489 A1 | 12/2014 | Jaiswal |
| 2014/0372702 A1 | 12/2014 | Subramanyam |
| 2015/0006482 A1 | 1/2015 | Hardy |
| 2015/0006813 A1 | 1/2015 | Goyal et al. |
| 2015/0012690 A1 | 1/2015 | Bruce |
| 2015/0012735 A1 | 1/2015 | Tamir et al. |
| 2015/0039712 A1 | 2/2015 | Frank et al. |
| 2015/0067087 A1 | 3/2015 | Guerin |
| 2015/0088811 A1 | 3/2015 | Hase et al. |
| 2015/0088824 A1 | 3/2015 | Kamp et al. |
| 2015/0088830 A1 | 3/2015 | Kamp |
| 2015/0088926 A1 | 3/2015 | Chavan |
| 2015/0089121 A1 | 3/2015 | Coudhury et al. |
| 2015/0089125 A1 | 3/2015 | Mukherjee et al. |
| 2015/0089134 A1 | 3/2015 | Mukherjee |
| 2015/0089138 A1 | 3/2015 | Tao et al. |
| 2015/0089140 A1 | 3/2015 | Sridharan |
| 2015/0150017 A1 | 5/2015 | Hu |
| 2015/0187430 A1 | 7/2015 | Suzuki |
| 2015/0317349 A1 | 11/2015 | Chao |
| 2016/0103767 A1 | 4/2016 | Banerjee et al. |
| 2016/0132411 A1 | 5/2016 | Jolad et al. |
| 2016/0306574 A1 | 10/2016 | Friedman |
| 2016/0306923 A1 | 10/2016 | Van Rooyen |
| 2016/0308968 A1 | 10/2016 | Friedman |
| 2016/0328301 A1 | 11/2016 | Parakh et al. |
| 2016/0335310 A1 | 11/2016 | Lahiri et al. |
| 2017/0109317 A1 | 4/2017 | Hack et al. |
| 2017/0269837 A1 | 9/2017 | Stevens |
| 2017/0300592 A1 | 10/2017 | Breslow |
| 2018/0113640 A1* | 4/2018 | Fernandez ............ G06F 3/0634 |
| 2018/0321846 A1 | 11/2018 | Zhang |
| 2018/0341596 A1 | 11/2018 | Teotia |
| 2019/0095134 A1* | 3/2019 | Li ......................... G06F 3/0659 |
| 2020/0012456 A1 | 1/2020 | Tomar |

FOREIGN PATENT DOCUMENTS

| | | |
|---|---|---|
| WO | WO 93/18461 | 9/1993 |
| WO | WO2007/045839 A2 | 4/2007 |
| WO | WO2013/109640 A1 | 7/2013 |
| WO | WO 2015/094179 A1 | 6/2015 |

OTHER PUBLICATIONS

Tao, U.S. Appl. No. 15/720,972, filed Sep. 29, 2017, Office Action, dated Sep. 13, 2018.

(56) References Cited

OTHER PUBLICATIONS

Loaiza, U.S. Appl. No. 15/693,273, filed Aug. 31, 2017, Office Action, dated Oct. 2, 2018.
Feng et al., "Accelerating Relational Databases by Leveraging Remote Memory and RDMA", Proceedings of the 2016 International Conference on Management of Data, SIGMOD, Jan. 1, 2016, pp. 355-370.
Lahiri, U.S. Appl. No. 14/709,018, filed May 11, 2015, Final Office Action, dated Jul. 12, 2018.
Tao, U.S. Appl. No. 15/720,972, filed Sep. 29, 2017, Final Office Action, dated Jan. 24, 2019.
Rest, U.S. Appl. No. 15/409,091, filed Jan. 18, 2017, Notice of Allowance, dated May 14, 2019.
Lahiri, U.S. Appl. No. 14/709,018, filed May 11, 2015, Office Action, dated Apr. 22, 2019.
Anonymous: "Transaction Handling", dated Jan. 1, 2002, https://docs.oracle.com/cd/A87860_01/doc/java.817/a83725/trans1.htm, 12 pages.
Anonymous: "Chapter 6 Handling" Transactions with Enterprise Beans, dated Jan. 1, 2004, https://docs.oracle.com/cd/E19229-01/819-1644/detrans.html, 16 pages.
Lahiri, U.S. Appl. No. 14/709,018, filed May 11, 2015, Office Action, dated Oct. 18, 2017.
Wikipedia, the free encyclopedia, "Cuckoo Hasing", https://en.wikipedia.org/wiki/Cuckoo_hashing, last viewed on Jul. 31, 2017, 7 pages.
Wang et al., "C-Hint: An Effective and Reliable Cache Management for RDMAAccelerated Key-Value Stores", dated 2014, 2 pages.
Tyler Szepesi, et al. "Nessie: A Decoupled, Client-Driven, Key-Value Store using RDMA", Copyright 2015 the authors CS-2015-09, 13 pages.
Szepesi, Tyler, et al. "Designing a low-latency cuckoo hash table for write-intensive workloads using RDMA." First International Workshop on Rack-scale Computing. 2014, 6 pages.
Pavlo, Andy, "15-721 Database Systems", Lecture #23 Non-Volatile Memory, dated Spring 2016, 70 pages.
Mitchell et al., "Using One-Sides RDMA Reads to Build a Fast, CPU-Efficient Key-Value Store" dated 2013, 12 pages.
Kalia et al., "Using RDMA Efficiently for Key-Value Services", ACM SIGVOMM, https://www.researchgate.net/publication/266659972_Using_RDMA_Eff, 5 pages, Aug. 2014.
Fan et al., "MemC3: Compact and Concurrent MemCache With Dumber Caching and Smarter Hashing", NSDI'13, dated Apr. 2013, 14 pages.
Dragojević, et al., "FaRM: Fast Remote Memory", https://www.usenix.org/conference/nsdi14/technical-sessions/dragojević, dated Apr. 2014, 15 pages.
Shi, U.S. Appl. No. 15/720,949, filed Sep. 29, 2017, Office Action, dated Oct. 4, 2019.
Tao, U.S. Appl. No. 15/720,972, filed Sep. 29, 2017, Final Office Action, dated Jan. 6, 2020.
Loaiza, U.S. Appl. No. 15/693,273, filed Aug. 31, 2017, Notice of Allowance, dated Jan. 27, 2020.
Meiyyappan, U.S. Appl. No. 15/721,328, filed Sep. 29, 2017, Office Action, dated Nov. 29, 2019.
Ailamaki, Anastassia, et al, "Weaving Relations for Cache Performance," Proceedings of the 27$^{th}$ International Conference on Very Large Data Bases, Rome, Italy, Sep. 11-14, 2001, 14 pages.
Elmasri, et al., "Fundatmentals of Database Systems," Third Edition, Addison-Wesley Longman, Inc., Copyright © 2000, ISBN-0-8053-1755-4, pp. 32, 70, 118, 131-132, 134, 155-159, 170, 252-254, 558, 569-573, 591-592, and 789-790 (26 pgs).
Hilland et al., "RDMA Protocol Verbs Specification" Version 1.0), dated Apr. 25, 2003, 243 pages.
Culley P. et al., "An RDMA Protocol Specification" Internet Draft, dated Sep. 16, 2002, 58 pages.
Microsoft, "Database Instant File Initialization", SQL Server 2016, https://msdn.microsoft.com/en-us/library/ms175935.aspx, 3 pages.
Aronovich et al., "The Design of a Similarity Based Deduplication System", SYSTOR, 2009, 14 pages.
Forman et al., "Efficient Detection of Large-Scale Redundancy in Enterprise File Systems", dated Jan. 2009, 8 pages.
Bober, Paul M., et al., "On Mixing Queries and Transactions via Multiversion Locking", Computer Sciences Department, University of Wisconsin, 1992, pp. 535-545.
Mohan, C., et al., "Efficient and Flexible Methods for Transient Versioning of Records to Avoid Locking by Read-Only Transactions", XP000393583, IBM Almaden Research Center, publication date Feb. 6, 1992, pp. 124-133.
Harder Theo et al., "Database Caching—Towards a Cost Model for Populating Cache Groups," ADBIS 2004, LNCS 3255, A. Benczur, J. Demetrovics, 15 pages.
Oracle, Oracle Times Ten In-Memory Database API and SQI Reference Guide, Release 6.0, dated 2006, 37 pages.
Teschke et al., "Concurrent Warehouse Maintenance Without Comprising Session Consistency", University of Erlangen-Nuremberg., Pub 1998, 10 pages.
Vassilakis et al., "Implementation of Transaction and Concurrency Control Support in a Temporal DBMS", Department of Information Systems, University of Athens, vol. 23 No. 5. Pub 1998, 16 pages.
Oracle®, "TimesTen to TimesTen Replication Guide" Release 7.0 B31684-03, Sep. 2007. http://download.oracle.com/otn_hosted_doc/timesten/703/TimesTen-Documentation/replication.pdf.
Oracle®, "TimesTen to TimesTen In-Memory Database Introduction" Release 7.0, B31687-03, Sep. 2007. http://download.oracle.com/otn_hosted_doc/timesten/703/TimesTen-Documentation/intro.pdf.
Oracle® Clusterware, Administration and Deployment Guide, 11g Release 1 (11.1), B28255-06, Oct. 2008. http://download.oracle.com/docs/cd/B28359_01/rac.111/b28255.pdf.
The Times Ten Team, Mid-Tier Caching: The Times Ten Approach, Jun. 2002. ACM SIGMOD, 6 pages.
Bornhovd et al., "Adaptive Database Caching with DBCache", IEEE 2004, pp. 11-18.
The TimesTen Team, "High Performance and Scalability through Application-Tier, In-Memory Management", Proceedings of 26$^{th}$ International Conference on Very Large Databases, Cairo, Egypt, 2000, pp. 677-680.
Yu, Kai, "Ioug Collaborate 2015 conference paper: Leveraging Oracle ASM Cluster File System for Cloud Storage", dated Apr. 2016, 13 pages.
USENIX, "Proceedings of the Freenix Track: 2003 USENIX Annual Technical Conference", dated Jun. 2003, 11 pages.
Petersen et al., "The Role of Ssd Block Caches in a World of Networked Burst Buffers", dated 2018, 5 Pages.
Oracle Open World, "#OOW18", dated Oct. 2018, 34 pages.
Noronha et al., "Designing NFS With Rdma for Security, Performance and Scalability", Technical Report, dated Jun. 8, 2007, 22 pages.
Jayakumar et al., "A Simple Measuring Model for Evaluating the Performance of Small Block Size Accesses in Lustre File System", vol. 7, No. 6, dated 2017, 6 pages.
Gluster Community, "GlusterFS Documentation, Release 3.8.0", dated Aug. 10, 2018, 56 pages.
Gelbart et al. "Bayesian Optimization with Unknown Constraints", dated May 22, 2014, 10 pages.
Laitala, Joni, "Metadata Management in Distributed File Systems", University of Oulu dated Jun. 9, 2017, 20 pages.

* cited by examiner

DBMS 200

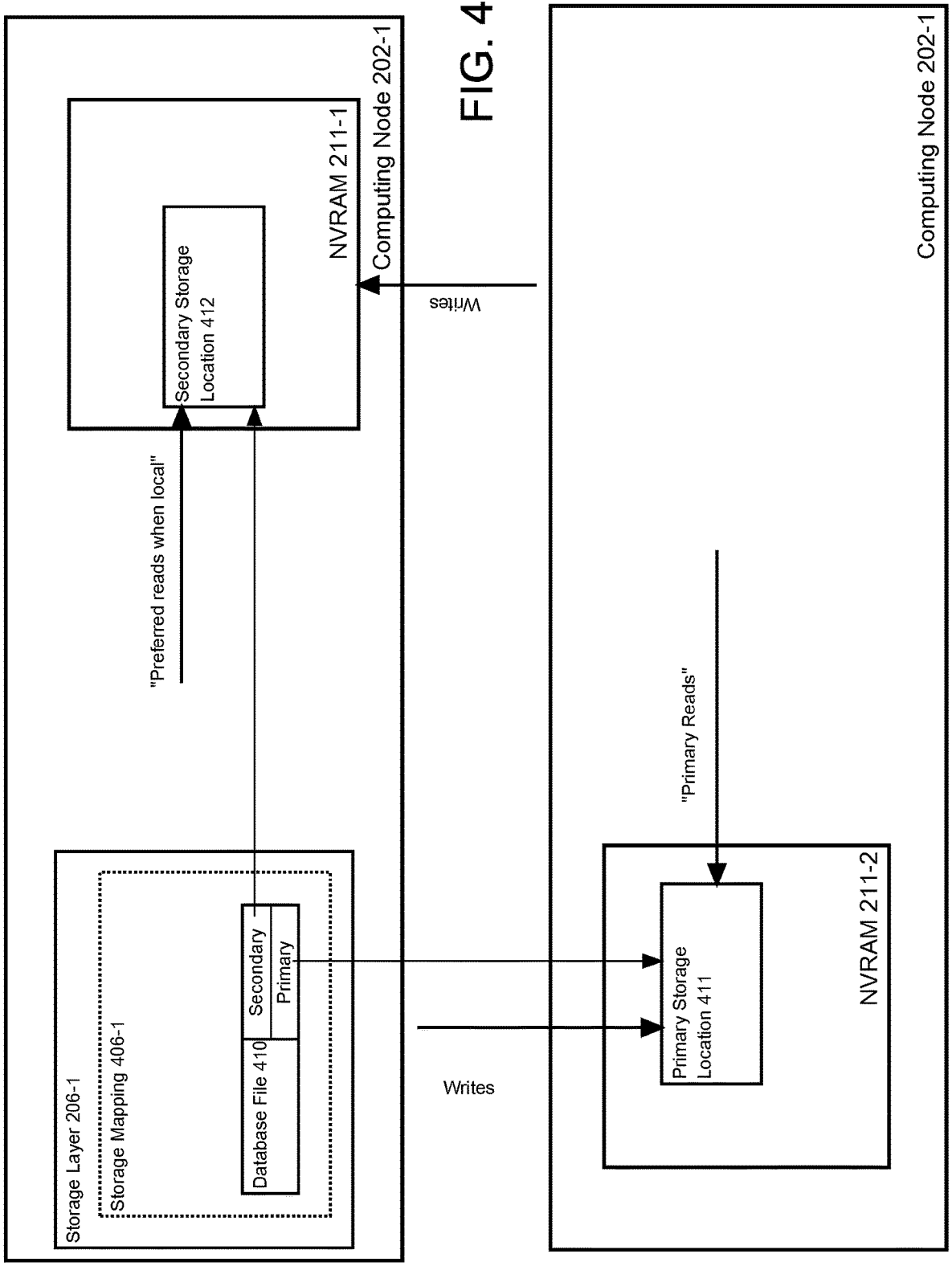

DATABASE WITH NVDIMM AS PERSISTENT STORAGE

RELATED APPLICATIONS

The present application is related to U.S. patent application Ser. No. 15/720,949 entitled REMOTE ONE-SIDED PERSISTENT WRITES, filed by Jia Shi, et al., on the equal day herewith, the entire contents of which are incorporated herein by reference.

The present application is related to U.S. patent application Ser. No. 15/720,972 entitled NV CACHE, filed by Zuoyu Tao, et al., on the equal day herewith, the entire contents of which are incorporated herein by reference.

The present application is related to U.S. patent application Ser. No. 15/721,328 entitled STRONG DERIVED SUMMARIES ON PERSISTENT MEMORY OF A STORAGE DEVICE, filed by Krishnan Meiyyappan, et al., on the equal day herewith, the entire contents of which are incorporated herein by reference.

TECHNICAL FIELD

The present disclosure relates to database systems. More specifically, the disclosure relates to relational database organization for storing database data in shared storage.

BACKGROUND

A DBMS (Database Management System) is an important mechanism for storing and managing many types of data. A DBMS comprises at least one database server. The database server is hosted on at least one computing element (e.g. computer, server blade) and may store database data in block mode storage devices. The block mode storage devices may be one or more disk drives and flash drives connected via a high speed bus of the computing element to the one or more hardware processors ("processors") of the computing element and/or memory of the computing element. A block mode storage device may also be a network enabled storage device that is connected via a network to the computing element and that comprises other block storage devices such as disk drives and flash drives.

More powerful DBMSs are hosted on a parallel processor hardware platform. Such DBMSs are referred to herein as multi-node DBMSs. A multi-node DBMS comprises multiple computing elements referred to herein as computing nodes. Each computing node comprises a hardware processor or multiple hardware processors that each share access to the same main memory. A multi-node DBMS may use one of several storage architectures to store database data.

One such architecture is referred to herein as the shared storage architecture. In the shared storage architecture, each computing node in a multi-node DBMS shares direct network access to one or more block storage devices that persistently store the database.

FIG. 1 is a block diagram that illustrates a shared storage multi-node DBMS. Referring to FIG. 1, shared storage multi-node DBMS 100 comprises database server instances, each hosted on a respective computing node, each database server instance providing access to the same database stored on shared storage 121. The database server instances of DBMS 100 comprise database server instances 103-1, 103-2, 103-3, and 103-4, which are hosted on computing nodes 102-1, 102-2, 102-3, and 102-4, respectively. The shared storage 121 comprises storage cells 122-1 and 122-2. Each of database server instances 103-1, 103-2, 103-3, and 103-4 is connected by a high speed network 101 to each of storage cells 122-1 and 122-2.

Each of storage cells 122-1 and 122-2 is a computing node that includes persistent storage (e.g. disk, flash memory) that store "database files" of the one or more databases of DBMS 100. Storage cell 122-1 includes persistent storage 129-1 and main memory 124-1 and storage cell 122-2 includes persistent storage 129-2 and main memory 124-2. One or more storage processes running on each of storage cells 122-1 and 122-2, such as storage process 125-1 and storage process 125-2, receive requests from any of database server instances 103-1, 103-2, 103-3, and 103-4 to read or write data blocks from or to database files stored in persistent storage. Storage cell buffer pool 128-1 and storage cell buffer pool 128-2 are buffers allocated from main memory 124-1 and 124-2, respectively. The term process, as used herein, refers to a computer system process, which is defined in the section Software Overview.

Database Server Instances

Each of the database server instances comprise database processes that run on the computing node that hosts the database server instance. A database process may be, without limitation, a process running within a database session that executes database commands issued within the database session or a query execution process belonging to a pool of processes that is assigned to execute queries issued through database sessions.

Referring to FIG. 1, each of database server instances 103-1, 103-2, 103-3, and 103-4 comprise multiple database processes and database buffers that cache data blocks read from shared storage 121. Database server instances 103-1, 103-2, 103-3, and 103-4 are hosted on computing nodes 102-1, 102-2, 102-3, and 102-4, respectively. Database server instance 103-1 comprises database processes 105-1a and 105-1b, which run on computing node 102-1, and database buffer pool 108-1, which is allocated from main memory 104-1. Database server instance 103-2 comprises database processes 105-2a and 105-2b, which run on computing node 102-2, and database buffer pool 108-2, which is allocated from main memory 104-2. Database server instance 103-3 comprises database processes 105-3a and 105-3b, which run on computing node 102-3, and database buffer pool 108-3, which is allocated from main memory 104-3. Database server instance 103-4 comprises database processes 105-4a and 105-4b, which run on computing node 102-4, and database buffer pool 108-4, which is allocated from main memory 104-4.

Data Block Read Operation in Shared Storage Architecture

Any database server instance of DBMS 100 may access a data block stored in any storage cell of shared storage 121. To read a data block, a data block read operation is initiated by any database server instance of DBMS 100. For example, database server instance 103-1 initiates a data block read operation for a data block by transmitting a data block request for the data block via network 101 to storage cell 122-1, which stores the data block in persistent storage 129-1.

Before the data block is transmitted, the data block is first added to a storage cell buffer allocated from main memory in an operation referred to herein as read staging. Read staging entails retrieving a data block from persistent storage and writing the data block to random access memory ("RAM", e.g. non-volatile RAM memory) from where the data block is transmitted to the requester of the data block. Storage cell 122-1 retrieves the data block from persistent storage 129-1 and stores the data block in a buffer of storage cell buffer pool 128-1. From the buffer, the data block is transmitted to a buffer in database buffer pool 108-1. Similarly, database server instance 103-2 initiates a read operation for a data block by transmitting a request via network 101 to storage cell 122-1, which stores the data block in persistent storage 129-1. Storage cell 122-1 retrieves the data block from persistent storage 129-1 and stores the data block in a buffer of storage cell buffer pool 128-1. From the buffer, the data block is transmitted to a buffer in database buffer pool 108-2.

Various Advantages and Disadvantages of Shared Storage

Advantages of the shared storage architecture include, inter alia, higher availability. If any computing node and database server instance goes down, the database may remain available through the remaining computing nodes and/or database server instances. In addition, because each database server instance services and exposes the same database, clients may access that data in the database as a single database while exploiting the power of parallel processing provided by multiple computing nodes.

A disadvantage is that speed of access to the database by the multiple database service instances depends on a common network connection and processing and memory capacity of storage cells to perform read staging. Described herein are approaches for improving database access under a shared storage architecture.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 4 illustrates primary and secondary storage locations for mirroring according to an embodiment of the present invention.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details.

General Overview

Described herein is a novel shared storage architecture that persistently stores database files in non-volatile random access memories (NVRAMs) of computing nodes of a multi-node DBMS. NVRAM may have higher latency than volatile RAM but less latency than other forms of persistent storage, such as disk or flash. Like volatile RAM, NVRAM is byte addressable; an addressable byte or word may be loaded from NVRAM via a bus to a register of the hardware processor.

The computing nodes not only collectively store database data on NVRAMs of the computing nodes, but also host database server instances that process queries in parallel, host database sessions and database processes, and together manage access to a database stored on the NVRAMs of the computing nodes. Such an architecture is referred to herein as a NVRAM shared storage architecture.

Under the NVRAM shared storage architecture, to perform a data block read operation from persistent storage, a data block may be transferred directly over a network between NVRAM of a computing node that persistently stores the data block to a database buffer in volatile RAM of another computing node that requests the data block. The transfer is accomplished using remote direct memory access ("RDMA). Thus, database data may be read from shared persistent storage without need for read staging at the computing node that persistently stores the database data in NVRAM. Persistently stored database data is read from NVRAM with less latency and without the need for read staging to use non-volatile memory and to incur processor overhead at a storage cell.

In addition to techniques for performing a data block read operation to NVRAM, also described herein are techniques for performing a data block write operation to data blocks stored in NVRAM of an NVRAM shared storage architecture. The techniques are referred to herein as a one-sided write because only one database process needs to participate in the writing of a data block to NVRAM in order to successfully commit the write.

Illustrative NVRAM Shared Storage DBMS

Figure 2:
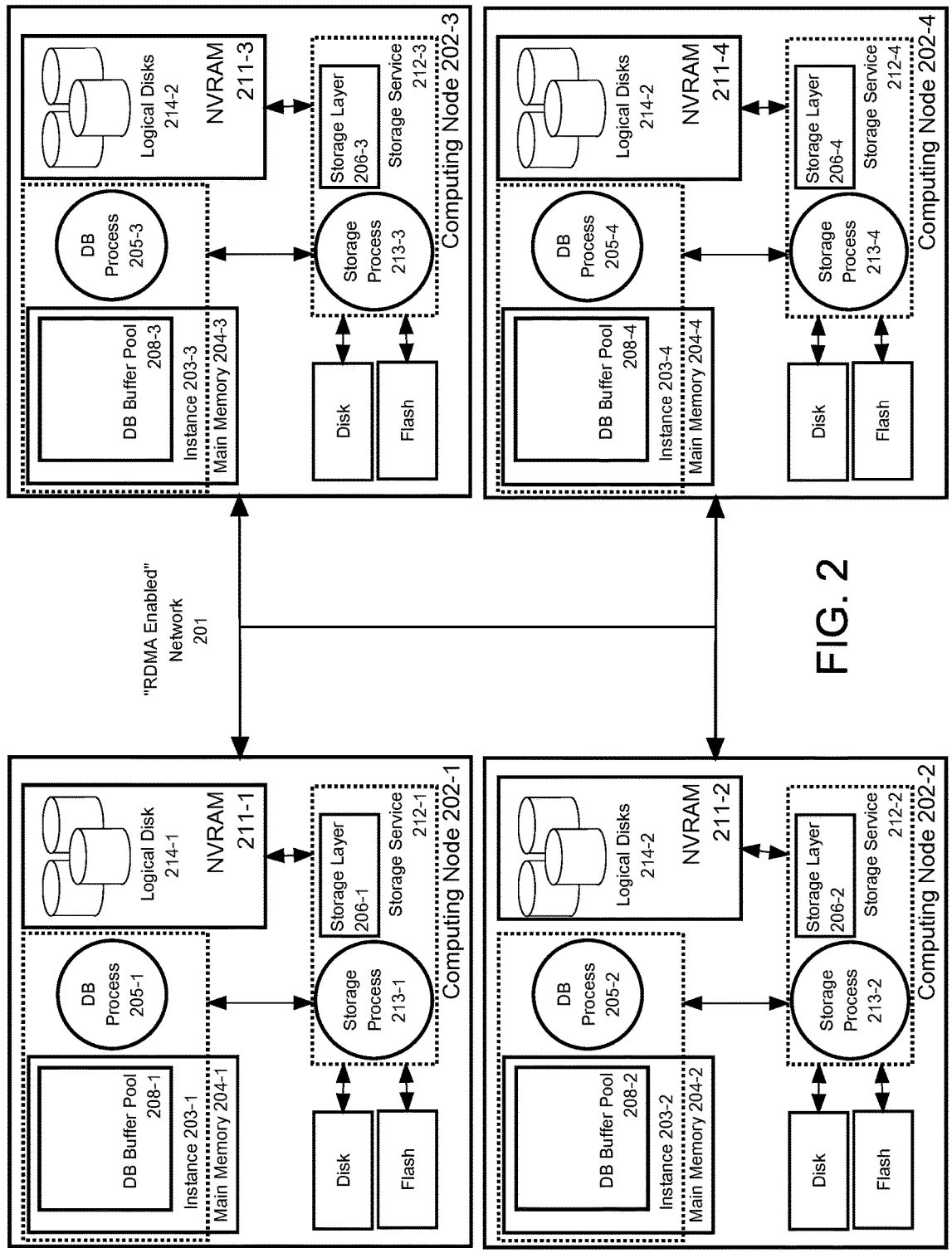
FIG. 2 illustrates a DBMS using a NVRAM-based shared storage structure according to an embodiment of the present invention.

FIG. 2 is a block diagram that illustrates a NVRAM shared storage multi-node DBMS according to an embodiment of the present invention. Referring to FIG. 2, DBMS 200 comprises database server instances, each hosted on a respective computing node, each database server instance providing access to a database stored on a shared storage comprising NVRAM from each computing node. DBMS 200 comprises database server instances 203-1, 203-2, 203-

3, and 203-4, which are hosted on computing nodes 202-1, 202-2, 202-3, and 202-4, respectively. Each of database server instances 203-1, 203-2, 203-3, and 203-4 is connected by a high speed network 201 to each other.

Database server instances 203-1 comprises database processes 205-1 and other database processes not shown, which run on computing node 202-1, and database buffer pool 208-1, which is allocated from main memory 204-1. Database server instance 203-2 comprises database processes 205-2 and other database processes not shown, which run on computing node 202-2, and database buffer pool 208-2, which is allocated from main memory 204-2. Database server instance 203-3 comprises database processes 205-3 and other database processes not shown, which run on computing node 202-3, and database buffer pool 208-3, which is allocated from main memory 204-3. Database server instance 203-4 comprises database processes 205-4 and other database processes not shown, which run on computing node 202-4, and database buffer pool 208-4, which is allocated from main memory 204-4. Main memory 204-1, 204-2, 204-3, and 204-4 comprise volatile RAM.

Like in DBMS 100, in DBMS 200 database data is stored in database files in shared storage that is accessible by database server instances of DBMS 200 over network 201. However, in DBMS 100, the database files are stored in block mode storage cells while in DBMS 200, the database files may be stored across NVRAMs of computing nodes that each also hosts a database server instance. The NVRAM on a computing node is directly accessible to other database server instances running on other computing nodes via RDMA mechanisms of network 201.

Referring again to FIG. 1, computing node 202-1, 202-2, 202-3, and 202-4 comprise NVRAM 211-1, 211-2, 211-3, and 211-4. In addition to including NVRAM, each computing node 202-1, 202-2, 202-3, and 202-4 may also include block mode persistent storage devices, such as flash memory or disk storage. Disk storage may be used to store shared database files in conjunction with storing the shared database files in NVRAM.

Storage Services

To initiate a data block read operation for a data block, a database process running within a database service instance needs to determine the home storage location ("home location") of the data block within a storage device, such as the memory address of a storage location within a NVRAM or a disk offset on a particular disk. To make this determination, a DBMS maintains mapping data within a data dictionary that specifies which database files hold data blocks for which database tables, and uses a storage service that maps ranges (or offsets) within the database files to storage locations on specific storage devices. Each database server instance of DBMS 200 may store a copy of the mapping data within volatile RAM for quick access.

For example, a data block is stored on a disk in a storage cell. To determine the location of the data block stored at a particular database file offset, the database process uses the storage service to determine what disk on what storage cell stores the data block and what storage location (or offset) on the disk corresponds to the database file offset. An advantage of using a storage service that maps database files to storage devices in this way is that the storage arrangement of database files on and between storage devices may be altered and/or otherwise managed without having to redefine the database files that hold the data blocks of a table.

According to an embodiment, each computing node of DBMS 200 hosts a storage service. Referring to FIG. 2, computing node 202-1 hosts storage service 212-1. Storage service 212-1 comprises one or more storage processes, such as storage process 213-1, and a software layer referred to as a storage layer. A storage layer includes software and associated storage metadata that describes how database files are stored on various storage devices, such as disks and NVRAM. The storage layer software is executed by storage processes and/or by database processes. Storage processes monitor and manage storage of database files within DBMS 200 and under circumstances explained later, may service requests for data blocks stored in NVRAM local to the storage processes.

An important function of storage service 212-1 is to provide a mapping between database files to a memory addresses on any NVRAMs of DBMS 200. Storage service 212-1 may map a database file, or an offset within the database file, to a memory address range within any of NVRAM 211-1, 211-2, 211-3, and 211-4. To determine the NVRAM and memory address therein that corresponds to an offset within a database file, a database process invokes a function of storage layer 206-1, passing in the identity of the database file and the offset; the function returns the particular NVRAM storing data for the offset and the memory address within the particular NVRAM at which the data is stored.

According to an embodiment, storage service 212-1 treats ranges within a memory addresses space of NVRAMs as logical disks. Abstracting a memory address range of NVRAM as a disk facilitates use of NVRAM by storage services that are based on software that is configured to support storage of database files on physical disks. Storage of database files within logical disks in NVRAM may thus be managed in ways very similar to the way storage of database files on disks are managed.

To this end, storage metadata within storage service 212-1 defines logical disks, and for each logical disk, maps the logical disk to a memory address range that corresponds to the logical disk drive within an address space of a particular NVRAM. A mapped NVRAM may be in any NVRAM in DBMS 200. With respect to storage service 212-1, storage metadata in storage layer 206-1 defines logical disks 214-1 within NVRAM 211-1 and maps database files to memory address ranges of NVRAM 211-1 that correspond to logical disks 214-1. Storage metadata in storage layer 206-1 defines logical disks 214-2 within NVRAM 211-2 and maps database files to memory address ranges of NVRAM 211-2 that correspond to logical disks 214-2. Storage metadata in storage layer 206-2 defines logical disks 214-3 within NVRAM 211-3 and maps database files to memory address ranges of NVRAM 211-3 that correspond to logical disks 214-3. Storage metadata in storage layer 206-4 defines logical disks 214-4 within NVRAM 211-4 and maps database files to memory address ranges of NVRAM 211-4 that correspond to logical disks 214-4.

Data Block Read Operation

Like disk and flash memory, NVRAM may have higher latency relative to volatile RAM. Thus, just as with disk-based DBMSs, data blocks stored in NVRAM are loaded into database buffers in volatile memory, where once loaded the data blocks are accessed and/or altered with greater speed by a database process. As mentioned previously, a database process initiates a data block read operation of a data block that loads the data block into a database buffer. The operations performed to load a data block from NVRAM to a database buffer depend on whether the data block is retrieved for a database process from local NVRAM or remote NVRAM.

Figure 3:
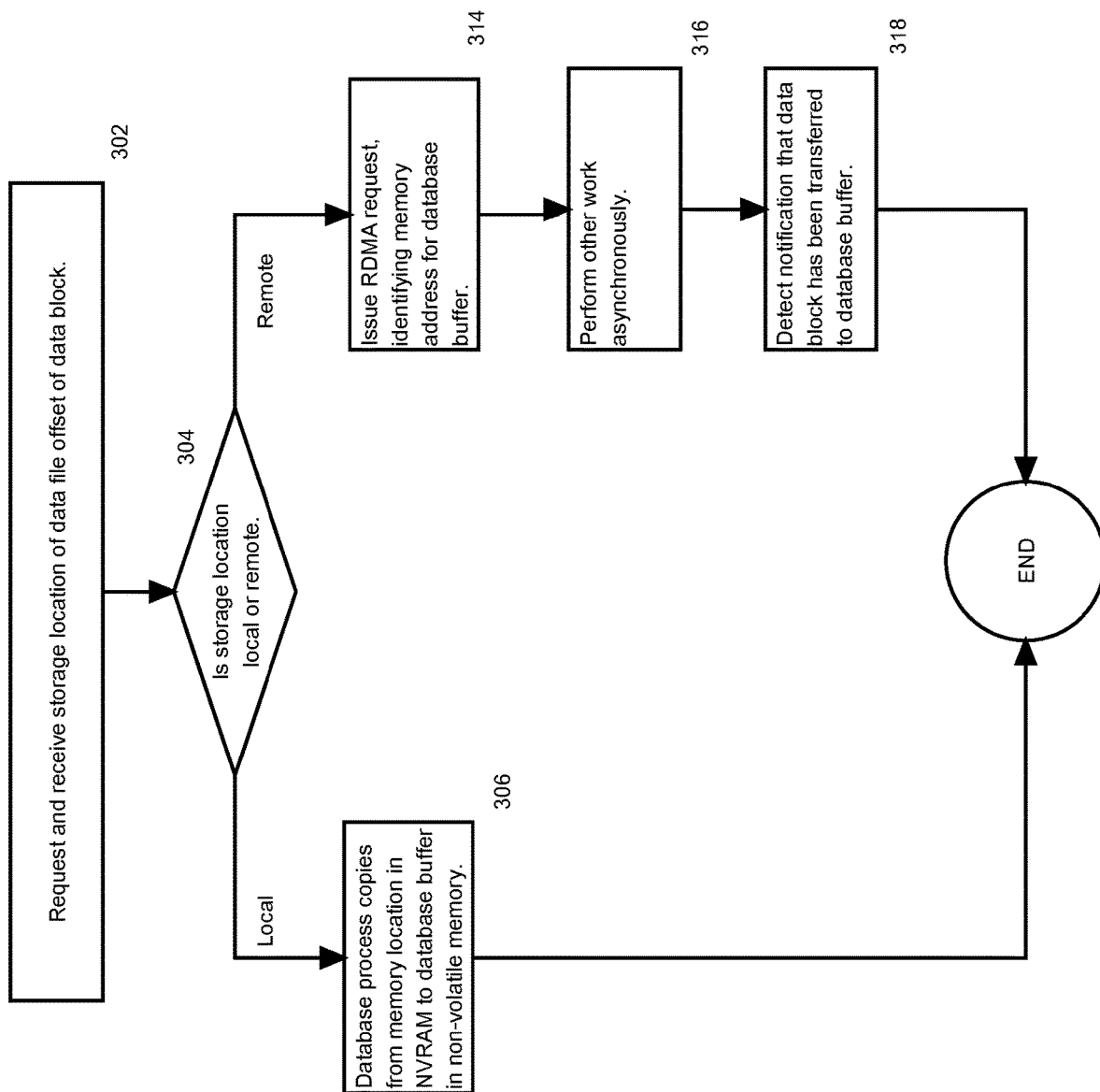
FIG. 3 illustrates a data block read operation according to an embodiment of the present invention.

FIG. 3 is a flow chart depicting operations performed for a data block read operation for a data block stored in NVRAM. The operations are illustrated using database process 205-1 on computing node 202-1. The operations are performed to retrieve data blocks during execution of a query to obtain data blocks required to compute the query.

Referring to FIG. 3, database process 205-1 makes a request for the storage location that corresponds to a database file offset for a data block. Database process 205-1 makes the request by invoking and executing a function of storage layer 206-1. Database process 205-1 determines that the database file and offset is mapped to a logical disk and offset, which is mapped to a "source" memory address of an NVRAM in DBMS 200. The identity of the NVRAM and source memory address is returned by the function.

At 304, a determination is made of whether the storage location is at a local NVRAM or remote NVRAM. For purposes of illustration, the database file and offset correspond to a source memory address within NVRAM 211-1, which is local to database process 205-1. Because the determination is that the storage location is for a local NVRAM, the execution proceeds to 306.

At 306, database process 205-1 itself copies the data block from the particular memory address to a database buffer. According to an embodiment, this copying may involve a hardware processor, on which database process 205-1 is running, copying bytes and/or words from NVRAM to a register of the hardware processor, and then from the register into main memory at the memory address that corresponds to the database buffer.

If in the current illustration, the storage location is instead at NVRAM 211-2, then the determination at 304 is that the storage location is at a remote NVRAM. Execution proceeds to 314.

At 314, database process 205-1 issues a RDMA read request. In RDMA, the direct transfer of data occurs through a RDMA mechanism on each of the computing nodes. According to an embodiment, the RDMA mechanism comprises a network interface hardware controller that is RDMA capable (RNIC) on each of the computing nodes. A process running on a hardware processor of an "initiating" computing node may issue a RDMA read request to a "local" RNIC on the computing node to read data stored at a "remote" memory address in the "remote" RAM of a "remote" computing node and write the data to a "local" memory address at the "local" RAM on the initiating computing node. In response to receiving the RDMA read request, the local RNIC and a "remote" RNIC transfer data from the remote RAM to the local RAM. The remote RNIC reads data at the remote memory address, transmits the data over the network to the local RNIC, which writes the data to the local RAM at the local memory address. No hardware processor on the initiating computing node or remote computing node participates in reading the data from the remote RAM, transmitting the data over the network, and writing the data to the local RAM.

Once the transfer of the data is completed, the local RNIC signals that the transfer of the data has been completed. The process initiating the request or another process may then access the transferred data at the local memory address.

In the current, illustration, database process 205-1 issues a RDMA read request for a data block stored at the source memory address at NVRAM 211-2 to write the data block at the memory address for the database buffer.

At 316, the database process may perform another task or other work and then, once notified of the completion of the transfer at 318, process the data block. The manner above in which database process 205-1 copies data using RDMA may be characterized as being performed asynchronously to the database process. While the data is being transferred using RDMA, the database process could perform work other than the work of transferring the data block between NVRAM and to a database buffer in volatile RAM, or the database process may be switched and so that another process can execute. When database process 205-1 copies the data from NVRAM to a database buffer, the manner of copying is referred to herein as synchronous because the copying is being performed by the database process itself.

Switching out requires context switching. Such overhead includes storing the context of the process (registers) and determining the next process to execute and restoring that process's context. To avoid such overhead, the database process may spin, that is, not switch out and not perform another task asynchronously, but instead keep executing a simple set of instructions until being notified of the transfer of the data block at 318. When RDMA reads are performed with low latency, the database process can complete the read operation with lower latency than under the asynchronous approach just described.

Figure 1:
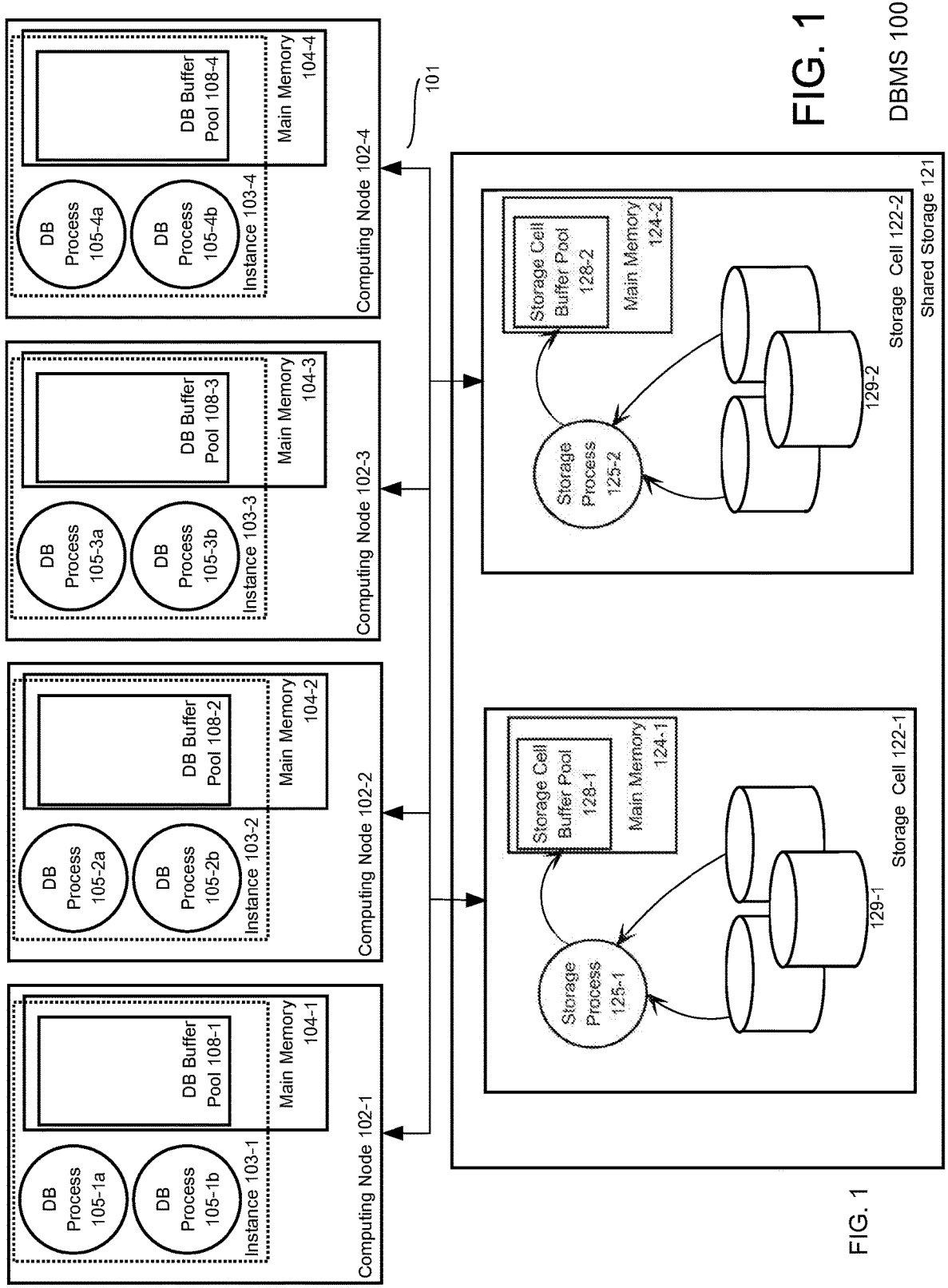
FIG. 1 illustrates a DBMS using a shared storage structure according to an embodiment of the present invention.

Finally, the data block read operation illustrated in FIG. 3 avoids operations that are performed in a storage cell based on the shared storage architecture illustrated in FIG. 1, even if RDMA is used to transfer data blocks between the storage cells and database buffers of a database server instance. Referring to FIG. 1, RDMA may be used to transfer data blocks between shared storage 121 and database buffers in non-volatile RAM of a database server instance of DBMS 100. However, the RDMA transfer does not occur until after read staging at a storage cell to a storage cell buffer.

For example, to return a data block requested by database process 105-2*a*, storage process 125-1 performs read staging of a data block. After read staging, the storage process 125-1 initiates a RDMA transfer to a memory address that was provided by database process 105-2*a*. Alternatively, storage process 125-1 returns the memory address of where the data block is staged in storage cell buffer pool 128-1 to database process 105-2*a*. Upon receipt of the memory address, database process initiates a RDMA transfer. According to an embodiment, any of the operations described in this paragraph are examples of operations that do not have to be performed in a data block read operation under a NVRAM shared storage architecture.

Preferring Local Reads in Mirrored Storage

Under data mirroring, a database file is stored redundantly in multiple storage locations. When a data block of a database file is written to persistent storage, the data block is written to the multiple storage locations that store copies of the database file. One storage location is referred to as a primary location because reads for the data blocks in the database file are primarily serviced from the primary location. The other storage locations are referred to as secondary locations. If the primary location goes offline or becomes otherwise unavailable, reads may be satisfied from one of the secondary locations.

In addition, while the primary location is offline, writes to the database file continue at the secondary storage location. When the primary storage location comes online, the primary storage location can be resynchronized with one of the secondary storage locations.

FIG. 4 depicts a data mirroring scheme for a database file 410. As defined by storage mapping 406-1 in storage layer 206-1, the primary storage location for database file 410 is primary storage location 411 in NVRAM 211-2 and the secondary storage location is secondary storage location 412 in NVRAM 211-1. Writes to database file 410 are made to both primary storage location 411 and secondary storage location 412. Reads of database file 410 are primarily serviced from primary storage location 411.

There are several reasons for primarily directing reads to a single primary storage location. Reads may be balanced across storage locations by balancing primary storage locations across storage locations. For storage cell based shared storage architectures, memory requirements for read staging is reduced. Read staging for a particular data block requires a buffer on one storage cell. If reads for a particular data block were distributed among multiple storage cells, read staging for the data block would occur across multiple storage cells, and multiple buffers would be used for read staging of the data block.

In a NVRAM shared storage architecture, a secondary storage location for a data block may be local to a process requesting the data block. In this case, the data block can be accessed and transferred to a database buffer far more efficiently and quickly than the data block can be transferred over a network via RDMA. In an embodiment of the present invention, to read a data block into a database buffer, a database process determines, based on a storage mapping of a storage service, whether a secondary location for the data block is at a NVRAM local to the database process, i.e. is on the computing node on which the database process runs. If the determination is that a secondary location is a local NVRAM, the database process retrieves the data block as described for operation 306 (see FIG. 3).

Non-Interleaved Memory for Higher Availability

Computing elements arrange memory devices in memory banks. In each bank, one word may be accessed at a time. However, each bank may be accessed concurrently, and thus words may be accessed concurrently when each word is in a separate bank. The number of words that can be accessed concurrently depends on the number memory banks. To enhance access to contiguous words (i.e. words that are stored at contiguous addresses within a memory address space), memory banks may be configured in an interleaved mode, in which contiguous words are stored in separate memory banks, where sets of words can be accessed concurrently. However, as shall be explained in further detail, storing database files in NVRAM in interleaved mode may adversely impact DBMS availability.

Figure 5B:
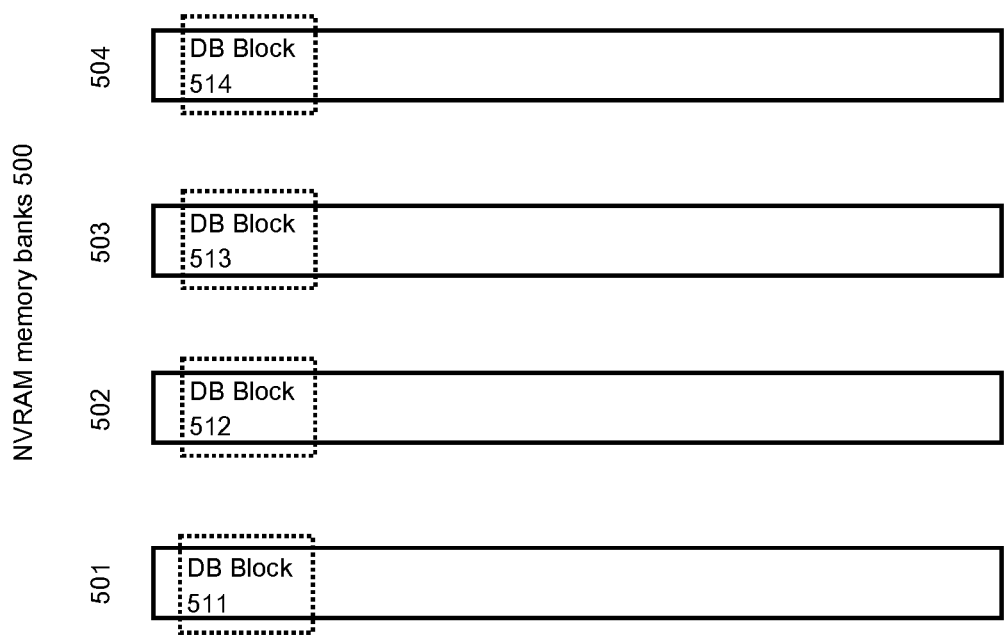
FIGS. 5A and 5B illustrate database files stored in interleaved and non-interleaved mode in NVRAM according to an embodiment of the present invention.
Figure 5A:
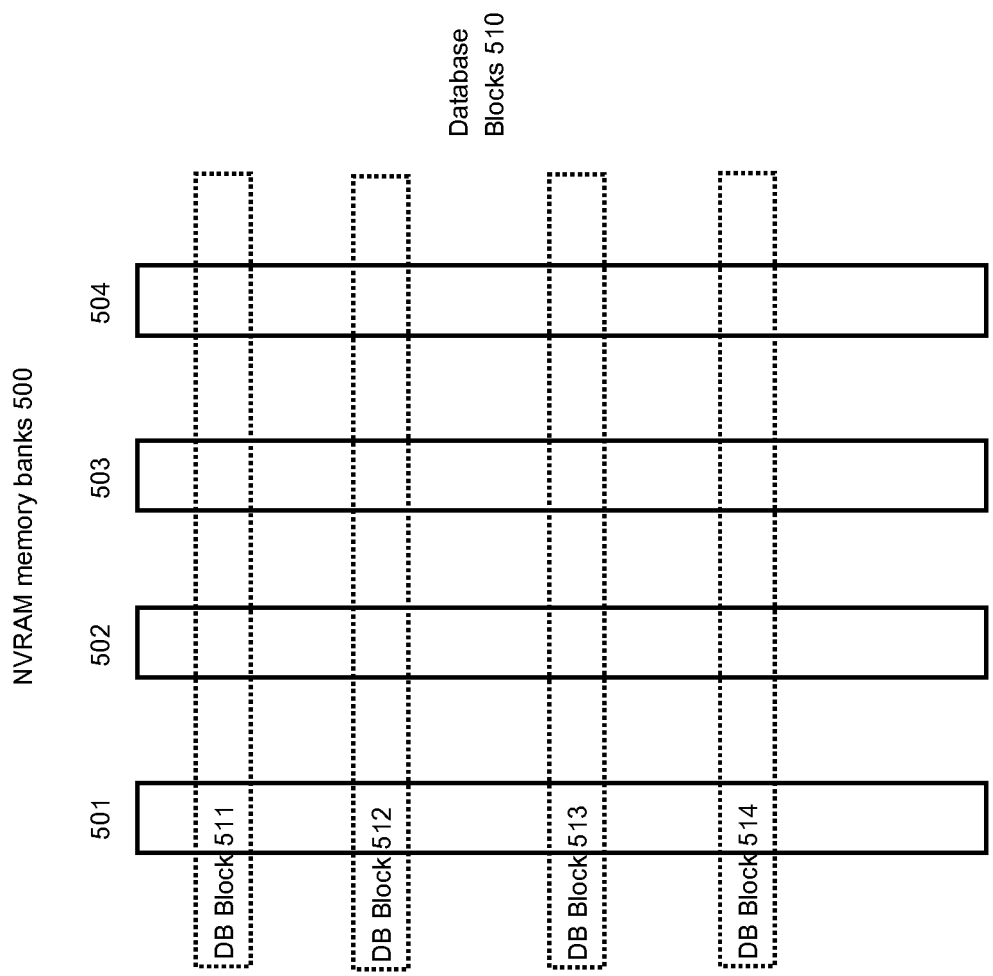

FIGS. 5A and 5B depict a memory bank that may be used for NVRAM 211-1, 211-2, 211-3, and 211-4, and which may store database blocks of database files in an interleaved mode (see FIG. 5A) and in a non-interleaved mode (FIG. 5B). Referring to FIG. 5A, NVRAM memory banks 500 include memory banks 501, 502, 503, and 504 and database blocks 510 includes database blocks 511, 512, 513, and 514. As depicted in FIG. 5A, database blocks 510 are stored in interleaved mode. A portion of database block 511 is stored respectively in memory bank, 502, 503, and 504. Database blocks 512, 513, and 514 are also stored in similar interleaved fashion across memory banks 501, 502, 503, and 504.

FIG. 5B shows database blocks 510 stored in non-interleaved mode. Database block 511 is stored entirely within memory bank 501; database block 512 is stored entirely within memory bank 502; database block 513 is stored entirely within memory bank 503; and database block 514 is stored entirely within memory bank 504.

In interleaved mode, when memory bank 501 fails or otherwise becomes unavailable, a portion of each of database blocks 511, 512, 513, and 514 becomes unavailable, which in effect may render the entirety of the database blocks 511, 512, 513, and 514 unavailable. On the other hand, in non-interleaved mode, only database block 511 becomes unavailable. Thus, in case of unavailability or failure of just one memory bank, storing the database files in interleaved mode may reduce availability of data blocks in the database files stored in NVRAM in DBMS 200, while storing the database files in non-interleaved mode enhances availability.

Filtered Block Requests

According to an embodiment, a storage process services requests for data blocks that are filtered according to filtering criteria specified in the requests. Such requests are referred to herein as filtered data block requests. Database processes running on DBMS 200 may issue a filtered data block request to a storage process running on DBMS 200 to request filtered data blocks from data blocks stored locally on the computing node of the storage process. The filtered data block request specifies a range of data blocks and filtering criteria. In response to receiving a filtered data block request, a storage process performs filtered data block scans. Filtered data block scans comprise reading data blocks specified in the request, and applying the filtering to criteria to return data blocks that satisfy the filtering criteria.

Filtered data blocks returned as satisfying the filtering criteria may be data blocks containing at least one row satisfying the filtering criteria, or may be data blocks that contain only rows that satisfy the filtering criteria, the rows having been extracted from the specified data blocks by the storage process. The term data block is used herein to refer to either copies of data blocks stored in persistent storage or data blocks constructed to contain rows extracted from other the data blocks.

Examples of filtered data block requests and handling thereof are described in U.S. patent application Ser. No. 14/480,009, entitled Query And Exadata Support For Hybrid Columnar Compressed Data, filed on Sep. 8, 2014 by Vineet Marwah, et al., the entire contents of which are incorporated herein by reference. An advantage of filtered data block scanning is that data blocks are scanned and filtered by processes that can access data blocks in local storage, where the data blocks may be accessed far more quickly. Also, because the data blocks are filtered before returning data blocks over the network; the amount of data to transmit over the network is thereby reduced.

Figure 6:
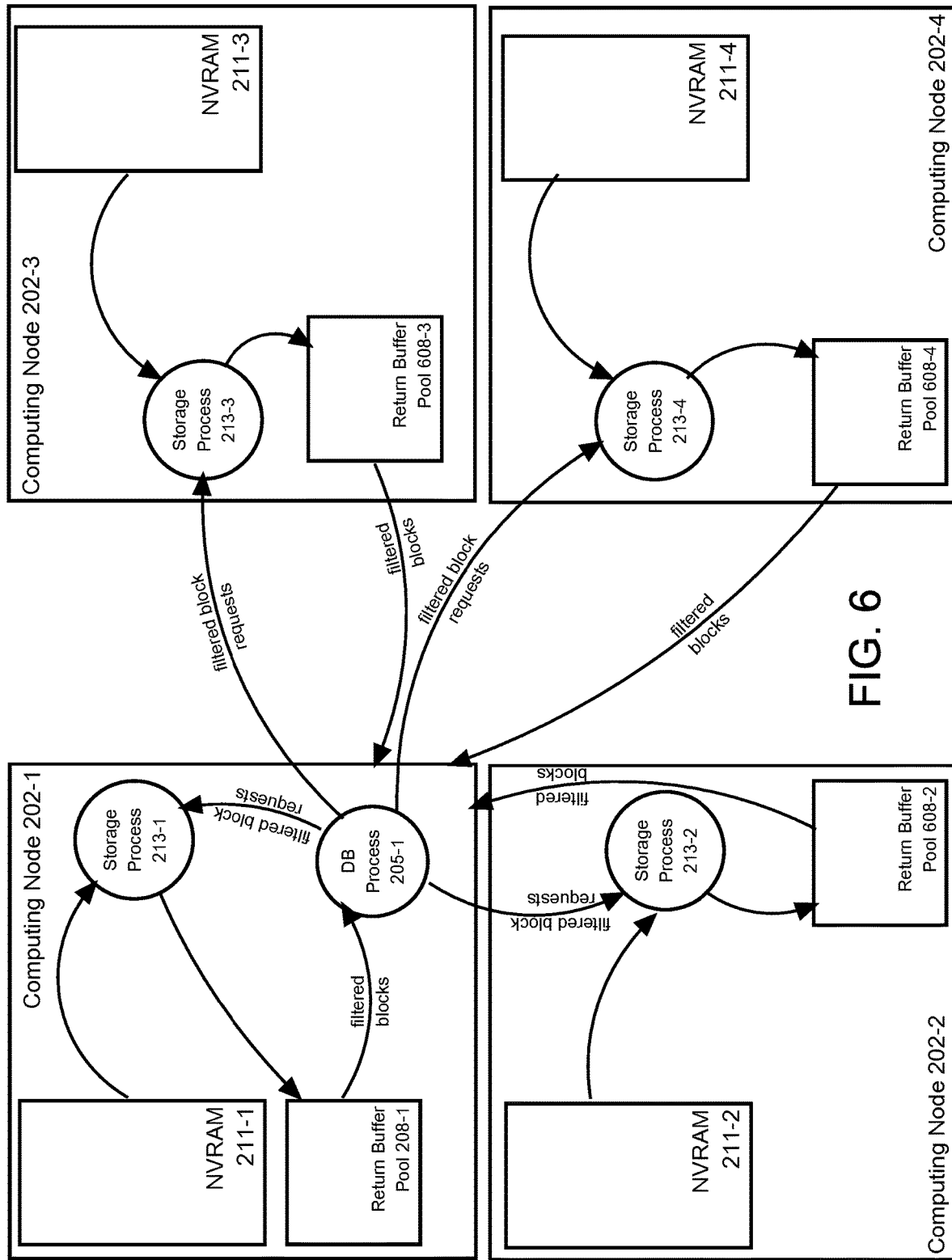
FIG. 6 illustrates servicing filtered data block requests in a NVRAM-based shared storage structure according to an embodiment of the present invention.

FIG. 6 depicts handling filtered data block requests by DBMS 200, and shows elements of DBMS 200 that participate in handling the filtered data block request. In addition, FIG. 6 depicts return buffer pools 608-1, 608-2, 608-3, and 608-4. Return buffer pools 608-1, 608-2, 608-3, and 608-4 are allocated from main memory 204-1, 204-2, 204-3, and 204-4, respectively, and are used to store data blocks processed during filtered data block scanning, where the data blocks may be accessed and examined more quickly than in NVRAM to perform filtered data scanning operations.

Referring to FIG. 6, database process 205-1 transmits filtered data block requests to storage processes 213-1, 213-2, 213-3, and 213-4. The filtered data block requests sent to storage processes 213-2, 213-3, and 213-4 are sent via network 201, while the filtered data block request sent to storage process 213-1, which is local to database process 205-1, is sent via a remote procedure call.

The filtered data block requests are issued to compute a query that applies a predicate condition to a column of the table. Database server instance 203-2 determines from storage mapping 406-1 that ranges of data blocks that store data for the table reside at respective memory address ranges on each of NVRAM 211-1, 211-2, 211-3, and 211-4. A filtered data block request sent to storage processes 213-1, 213-2, 213-3, and 213-4 specifies a respective memory address range in NVRAM 211-1, 211-2, 211-3, and 211-4 and the predicate condition as filtering criteria.

With respect to storage process 213-2, upon receipt of the respective filtered data block request, storage process 213-2 reads the specified data blocks into the return buffer pool 608-2 to stage the data blocks for further processing. While staged in return buffer pool 608-2, storage process 213-1 examines the data blocks to determine which of the data blocks satisfy the filtering criteria, i.e. have at least one row that satisfies the criteria. The data blocks that satisfy the filtering criteria are returned to database process 205-1. The data blocks may be returned using a RDMA transfer between return buffer pool 608-2 and database buffer pool 208-1 (not shown in FIG. 6).

With respect to storage processes 213-3 and 213-4, upon receipt of the respective filtered data block request, storage processes 213-3 and 213-4 perform similar operations involving specified data blocks in NVRAM 211-3 and 211-4, return buffer pool 608-3 and 608-4, and database buffer pool 208-1.

With respect to storage processes 213-1, upon receipt of the respective filtered data block request, storage process 213-1 performs similar operations involving specified data blocks in NVRAM 211-1 and return buffer pool 608-1, except that data blocks are returned to database buffer pool 208-1 without need to perform a RDMA transfer across network 201.

In an embodiment of the present invention, when performing a filtered data block scan, the data blocks are scanned in place. That is, the data blocks are examined while stored in NVRAM to determine whether filtering criteria is satisfied without staging the data blocks in return buffers.

One-Sided Writes

As mentioned before, a data block write operation may be performed by a DBMS using an approach referred to as one-sided writing. One-sided writing uses a RDMA write to write the data block to NVRAM. When writing a data block to NVRAM, it is possible that only part of the data block is written to the data block's location in NVRAM thereby leaving a partially written data block that is corrupt. The reason for this possibility is that the largest atomic write that can be performed using RDMA is much smaller than a data block. For example, the largest atomic RDMA write is eight bytes and a data block may be 4 kilobytes. When a database process RDMA writes a data block to a memory location, the data block is written in a series of separate atomic writes of 8 bytes each. Before the series can be completed, an error is encountered, thereby leaving a partially written data block.

It is possible that mechanisms can be used to cope with the partially written data block. However, such mechanisms have an overhead cost. Such overhead cost can be avoided using an approach that avoids partially overwriting a data block in this way.

According to an embodiment, a data block write operation using one-sided writing involves two operations: a remote write staging and a local write back. A remote database process performs the remote write staging, which involves a database process using RDMA writes to write a data block to a "write staging buffer" that resides on a "home node", which is a computing node hosting a home location of the data block. Once the RDMA writes are complete, the data block is marked at the home node as being staged. While the data block is marked as being staged, the data block is referred to as being in a "write staging deferred" state, and reads of the data block from the home location are blocked and/or are deferred. Subsequently, a storage process performs a local write back of the data block. In a local write back, a storage process writes a data block from the write staging buffer to the data block's home location and then unmarks the data block as being staged.

Even though a local write back of a data block may not be completed, once the data block is written to the staging buffer and marked as staged, the write is committed, that is, the write is in effect treated as having been completed at the home location. After the data block is marked as staged and has thereby entered the write staging deferral state, the older version of the data block stored at the home location is not returned by subsequent data block read operations; RDMA reads of the version of the data block stored in the home location are forgone or deferred until the local write back of the data block is completed. This approach is referred to as one-sided because only write operations initiated by a remote process requesting a write, in this case a database process, are needed to in effect commit the write of the data block.

Write Staging Participants

Figure 7:
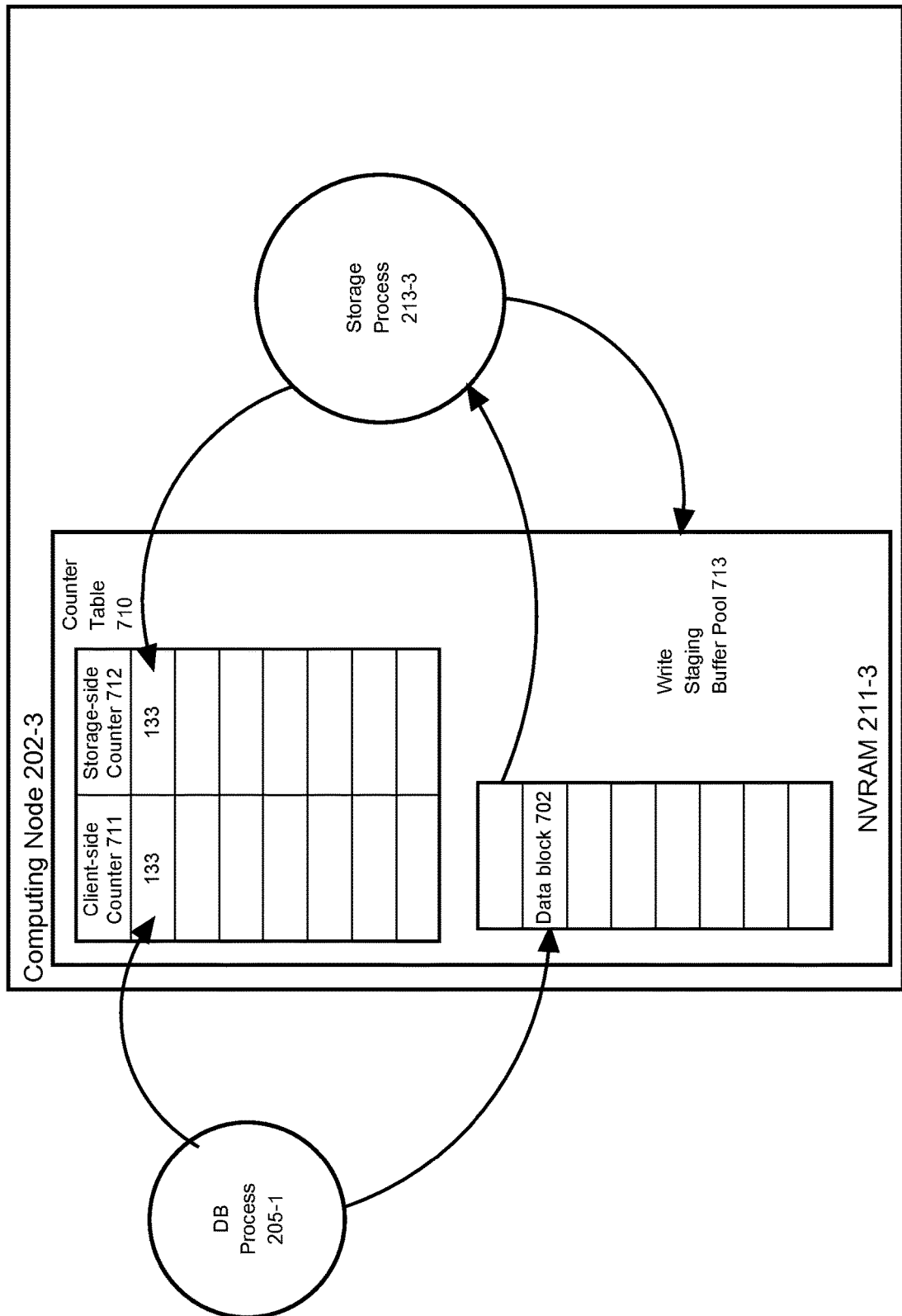
FIG. 7 illustrates a write staging buffer pool used for one-sided writing staging according to an embodiment of the present invention.

FIG. 7 is a diagram that illustrates components on a computing node of DBMS 200 that participate in one-sided writes and that are used in an illustration of an embodiment of the present invention. Referring to FIG. 7, it depicts computing node 202-3 and storage process 213-2, and counter table 710 and write staging buffer pool 713, both of which reside in NVRAM 211-3.

Counter table 710 contains records for data blocks stored in NVRAM 211-3. The records have two attributes that are counters, which include client-side counter 711 and server-side counter 712. Each record is associated with a data block stored in NVRAM 211-3, and contains a separate counter value in each of client-side counter 711 and server-side counter 712. According to an embodiment, the records in counter table 710 are fixed length. Each record is stored at a position within counter table 710 that maps to the logical disk and storage location (offset) of the data block that is associated with the record. In the course of performing a one-sided write, the counter values stored in a record for a data block are updated in a way that indicates when the write back to the home location of the data block is complete, as shall be explained in further detail.

Write staging buffer pool 713 is used to stage data blocks for one-sided writes, each data block being staged in a write staging buffer in write staging buffer pool 713. According to an embodiment, a database process writes a data block to a write staging buffer using a RDMA operation referred to herein as a zero-copy buffer write. Under a zero-copy buffer write, a computing node registers a buffer pool with a local RNIC and a "handler" process designated to be notified when a requested write to a buffer in the buffer pool is complete. A remote process may target a RDMA write to the buffer pool rather than to a particular memory location. Data is written to any buffer in the buffer pool and the handler process on the computing node is notified when data is written to a buffer. The RNIC does not write any more data to the buffer until the RNIC receives a notification that the buffer is available for receiving a RDMA write.

In the current illustration, write staging buffer pool 713 is registered as a buffer pool for zero-copy buffer writes and storage process 213-3 as the handling process to notify when a RDMA write of a data block to a write staging buffer is complete.

Remote Write-Staging

Figure 8:
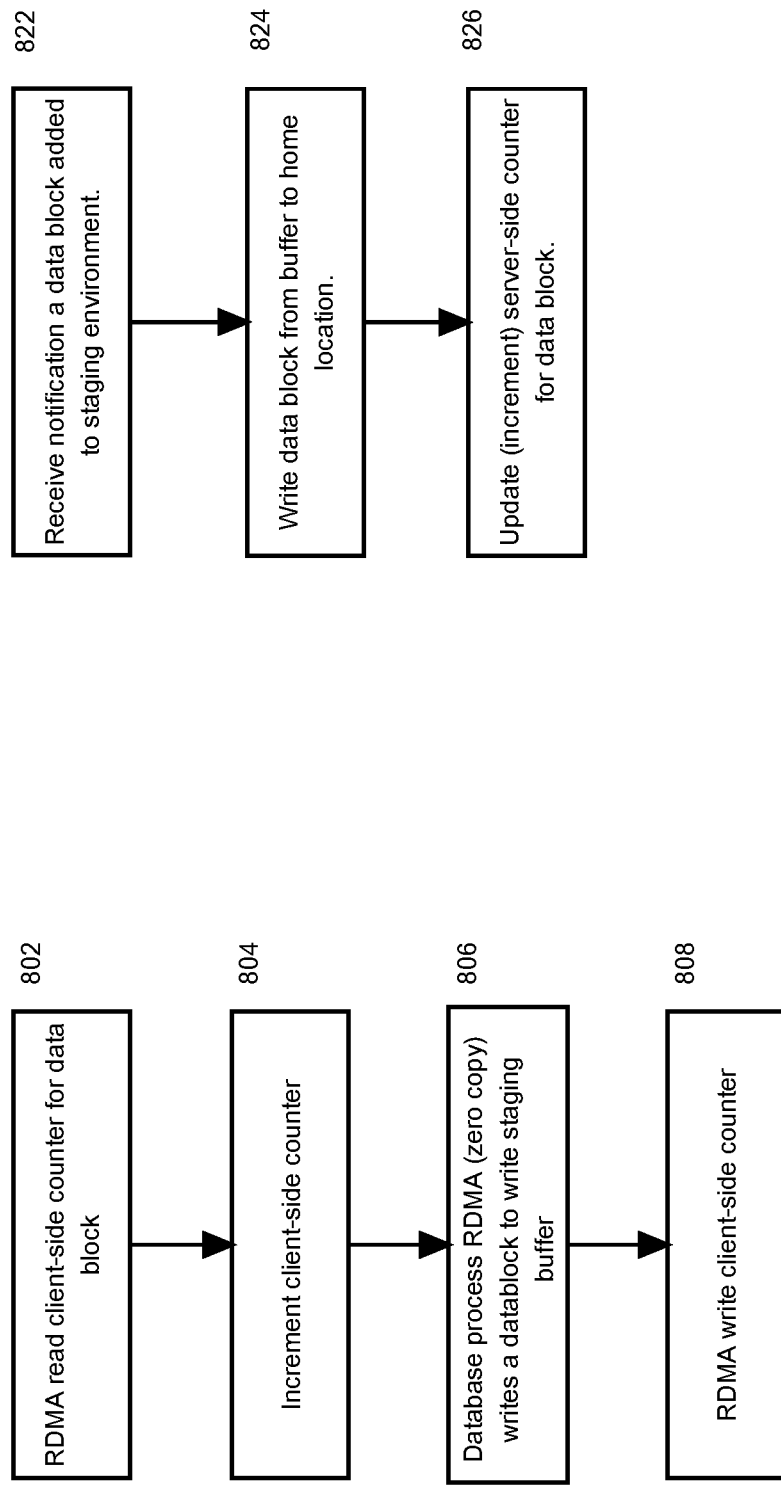
FIGS. 8A and 8B illustrate operations performed to write a data block using one-sided write staging according to an embodiment of the present invention.

FIG. 8A is a flowchart depicting remote write staging operation according to an embodiment of the present invention. Remote write staging is illustrated with the components shown in FIG. 7. FIG. 7 depicts, in addition to other components described previously, database process 205-1 and data block 702. In the current illustration, database process 205-1 is performing its part of a data block write operation according to the one-sided write approach. The home location of data block 702 is in NVRAM 211-3.

Referring to FIG. 8A, at 802, database process 205-1 RDMA reads a client-side counter value from the memory location that stores the record in the counter table 710 that is mapped to data block 702. The counter-value is 133.

Database process 205-1 calculates the memory location of the record using a base memory address of counter table 710 provided to database server instance 203-3 by storage service 212-3. The memory location is communicated, for example, as part of startup operations of DBMS 200 or a node join operation to add a database server instance as an instance to DBMS 200.

At 804, database process 205-1 updates the client-side counter value. The client-side counter value is incremented by 1 to 134.

At 806, database process 205-1 RDMA writes data block 702 to write staging buffer in write staging buffer pool 713. Database process 205-1 RDMA writes data block 702 using a zero-copy buffer write.

At 806, database process 205-1 RDMA writes the updated client-side counter value to the record and memory location from which the client-side counter value was retrieved. At this point, in the record in counter table 710, the client-side value is 134 and the storage-side counter value is 133. As shall be explained in greater detail, before a database process performs a RDMA read of a data block from its home location, the database process first reads the corresponding client-side counter value and storage-side counter value of the data block from counter table 710. The counter-side counter value being greater than the storage-side counter value indicates to the database process that the corresponding data block is in the write staging deferral state, meaning a newer version of the data block is in the write staging buffer pool 713 and has not yet been written to the respective home location.

Local Write Back

FIG. 8B is a flowchart depicting a local write back operation under one-sided writing, according to an embodiment of the present invention. The current illustration is continued to illustrate the local write back operation.

Referring to FIG. 8B, at 822, storage process 213-3 receives notification that a data block has been added to a particular write staging buffer in write staging buffer pool 713.

At 824, storage process 213-3 retrieves data block 702 from writing staging buffer pool 713 and writes the data block to the home location of the data block.

At 826, storage process 213-3 updates the storage-side counter value for data block 702, incrementing the storage-side counter value from 133 to 134. The client-side counter value now equals the storage-side counter value, thereby indicating that data block 702 is no longer in the write staging deferral state.

Data Block Read Operation for One-Sided Writing.

Figure 9:
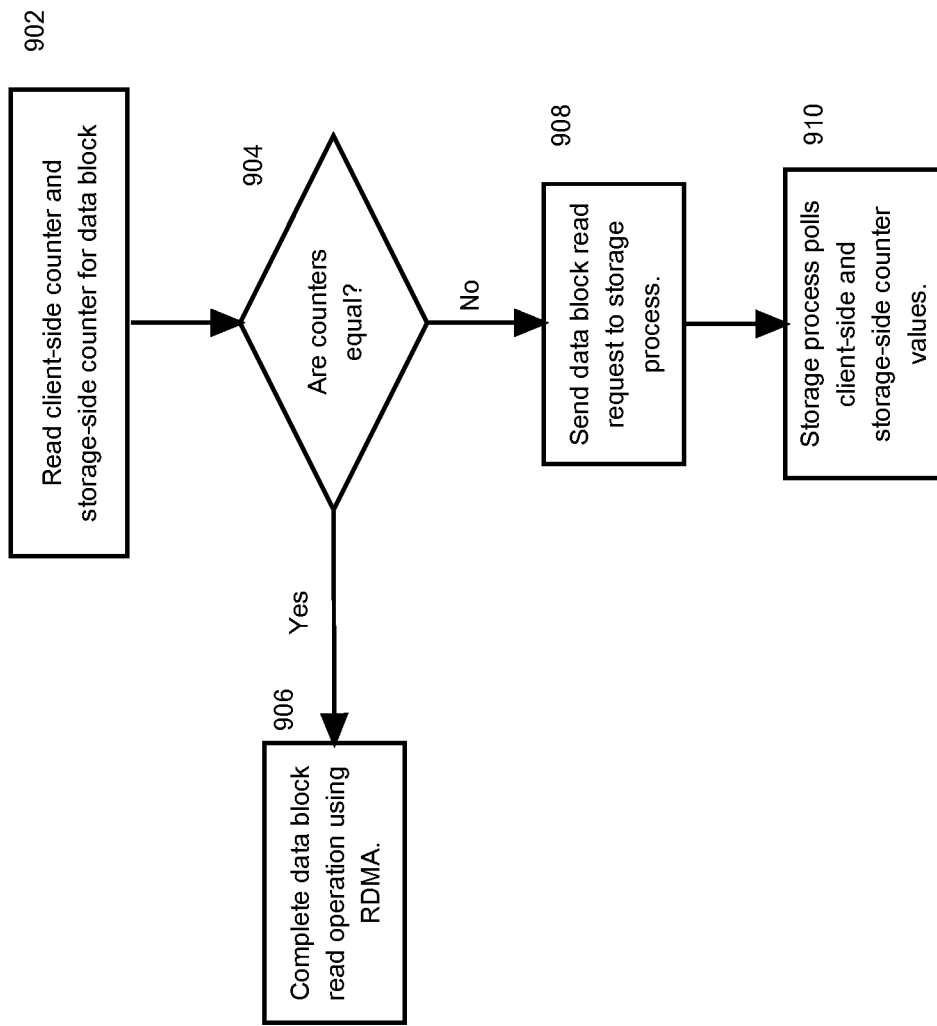
FIG. 9 illustrates operations performed for performing a database block read operation when using one-sided write staging according to an embodiment of the present invention.

FIG. 9 depicts a data block read operation under one-sided writing. The illustration of remote write staging for FIG. 8A is continued to illustrate the local write back operation. Thus, data block 702 has been written to write staging buffer pool 713 and the counter-side value and storage-side value for data block 702 are 134 and 133, respectively.

At step 902, database process 205-1 RDMA reads the client-side counter value and storage-side counter value for data block 702. At 904, database process 205-1 determines whether the client-side counter value is greater than the storage-side counter value. If the client-side counter value and storage-side counter value are equal, then at 906, database process 205-1 RDMA reads data block 702 from the respective home location of data block 702.

In the current illustration, however, database process 205-1 determines that the client-side value of 134 is greater than storage-side value of 133; the data block 702 is thus in the write staging deferral state.

In response to the determination, at 910, database process 205-1 forgoes the RDMA read at 906. Instead, database process 205-1 initiates a data block read by sending a data block read request to a storage process of storage service 212-3.

To service the data block read request for data block 702, the storage process also determines whether data block 702 is in the write staging deferral state by comparing the client-side counter and storage-side counter for data block 702. If the data block 702 is in the write staging deferral state, then storage process 213-3 defers reading and returning data block 702 from its home location while polling the client-side counter and storage-side counter, that is, intermittently reading the client-side counter and storage-side counter. Once the storage process determines that the polled client-side counter and storage-side counter are equal, the storage process reads the data block from the home location and returns the data block to the requestor.

As an alternate to a database process sending a data block read request to a storage process when the database process determines the data block is in the write staging deferral state, the database process itself may simply poll the client-side and storage-side counters and then RDMA read the data block when the counters are equal.

One sided write staging has been illustrated where the persistent storage to which a data block is deemed committed and written back is NVRAM, however an embodiment of the present invention is not so limited. The persistent storage may be any persistent storage, including disk-based memory and flash memory.

One-Sided Writes for Append-Only

Appending-only refers to a way of modifying data in a data structure in which data stored in the data structure is not overwritten and is modified by only appending data to data already in the data structure. In an append-only data structure, data is appended to the "append end" of the data structure. Specifically, within a memory address space of the data structure, data is appended by writing data to a memory address range adjacent to memory address range to which data was most recently written and committed.

According to an embodiment, append-only data stored in NVRAM may be updated using a one-sided write. An example append-only data structure in the context of database technology is a redo log in a DBMS.

Figure 10:
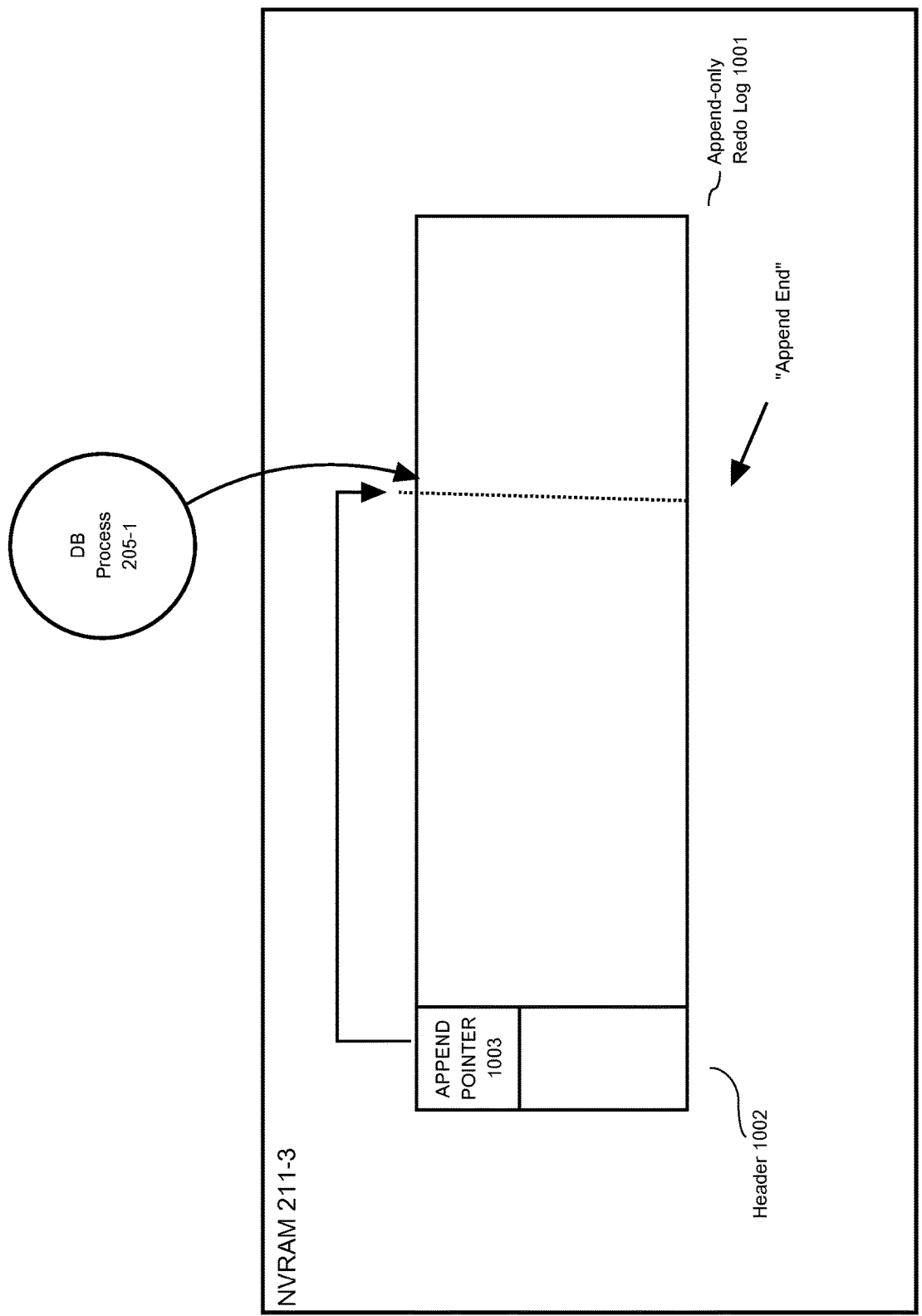
FIG. 10 illustrates a redo log, an example of an appending-only data structure stored in NVRAM according to an embodiment of the present invention.

FIG. 10 depicts a redo log used to illustrate an append-only one-sided write. Referring to FIG. 10, redo log 1001 is an append-only data structure stored in a contiguous memory address space (i.e. range) in NVRAM 211-3. The memory address space begins at a base memory address referred to herein as the head. Redo log 1001 is logically divided into data blocks (not illustrated) that each contain one or more redo records. A data block spans a memory address range within the memory address space of the redo log.

Redo log 1001 comprises a header at the beginning of the redo log. The header includes append pointer 1003, which points to the append end of redo log 1001, which is the memory address within redo log 1001 to which to append the next data block to add to redo log 1001. An append pointer maybe, without limitation, a memory pointer point to the append end or integer added to the head that resolves to the append end.

In a one-sided append-only write, one or more data blocks are RDMA written to the append end. If the one or more data blocks are written successfully, a RDMA write is issued to update append pointer 1003 to reflect the new append end. Once the updated append pointer 1003 is written successfully, then the append-only write is treated has having been committed.

Figure 11:
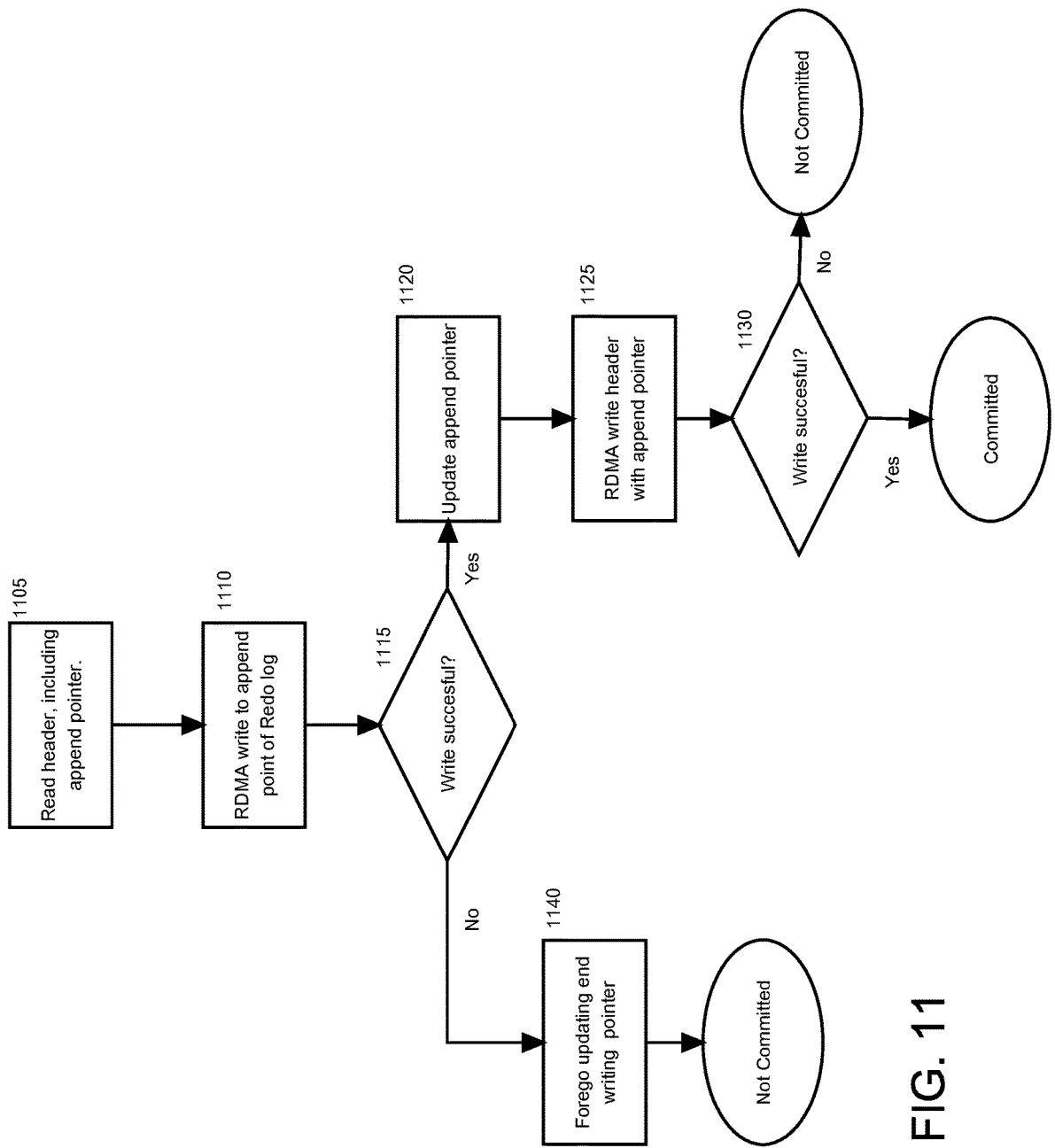
FIG. 11 illustrates operations performed for a one-sided append-only write according to an embodiment of the present invention.

FIG. 11 is a flow chart depicting a procedure for an append-only one-sided write according to an embodiment of the present invention. The procedure is illustrated using redo log 1001 and database process 205-1, which is executing remotely on computing node 202-1.

Referring to FIG. 11, at 1105, database process 205-1 reads RDMA header 1002, which includes append pointer 1003. At 1110, database process 205-1 issues a RDMA write to append a data block at the append end, the memory address currently pointed to by the append pointer 1003.

At 1115, database process 205-1 determines whether the RDMA of the data block is successful. If not successful, then at 1140, database process 205-1 foregoes writing the header with an updated append end value for append pointer 1003. In effect, the write is treated as uncommitted and having never occurred. The subsequent append-only write of a data block to redo log 1001 will be attempted at the original append end.

If the RDMA of the data block is successful, then at 1125, the value of append pointer 1003 is updated to an append end that reflects the addition of the data block. At 1125, database process 205-1 issues a RDMA write to write a new header 1002, the new header 1002 including the new value for append pointer 1003.

At 1115, database process 205-1 determines whether the RDMA write to header 1002 is successful. If not successful, append pointer 1003 is left pointing to the original append end. In effect, the write is treated as uncommitted and having never occurred. In a subsequent append-only write of a data block to redo log 1001, an attempt will thus be made to append the data block at the original append end.

If the RDMA write to header 1002 is successful, then the append-only write of the data block is treated as committed. In a subsequent write of data block to redo log 1001, an attempt will made to append the data block at the new append end pointed to by the updated append pointer 1003.

As shown above, if the RDMA write of the data block to append the data block to redo log 1001 or the write to update the append pointer 1003 both fail, the write is uncommitted. The redo log is in effect left in the original state that existed when the append-only write was initiated.

Other Advantages of One-Sided Writing

One-sided writing provides various advantages over other approaches that are two-sided. In two-sided writing, at least two processes participate to write and commit a data block to persistent storage. At a general level, a process running on a computing node initiates the write of a data block over a network to persistent storage of a destination computing node, where another "destination-side" process participates in writing the data block to persistent storage at the destination.

There are at least several variations to two-sided writing, all of which may involve waking up a destination-side process at the destination, including two-sided writing approaches that use RDMA and NVRAM. Some variations involve waking up the destination side process to write the data block after write staging at the destination to write the data block to persistent storage before acknowledging the write to the client process to commit the write. In a messaging variation, a client process sends a message to a destination-side process, the message including a data block to be written to persistent storage. The destination-side process write stages the data block to volatile RAM, writes the data block to persistent storage and then acknowledges the write to the destination-side process. In a two-sided approach that uses RDMA, a message is also sent from a client-side process to a destination-side process. However, the message does not contain the data block, but instead a location of memory from where to transfer a data block or to where to transfer a data block. The location of memory is used to perform a RDMA write. In one variation of a two-sided write using RDMA, the client-side process sends a message requesting a memory location at the destination to write using RDMA. In another variation, the client-side process sends a message to the destination-side process specifying a memory location at the client-side from where the destination-side process may retrieve a data block using RDMA.

Waking a process entails context switching. Thus, two-sided writing incurs the overhead of context switching. On the other hand, a one-sided approach does not use a destination-side process to successfully commit a write of a data block and therefore avoids the cost of context switching on the destination side. In addition, one-sided writing enables one-sided reads of data blocks, which also do not incur the cost of awaking a second process.

Storage Cell Based NVRAM Shared Storage Architecture

The NVRAM shared storage architecture described above distributes the home location of data blocks across NVRAMs on computing nodes that host database server instances. However, the approaches are not limited to this type of NVRAM shared storage architecture. A NVRAM shared storage architecture may be based on home locations distributed among NVRAMs of storage cells rather than of computing nodes that host database server instances.

Figure 12:
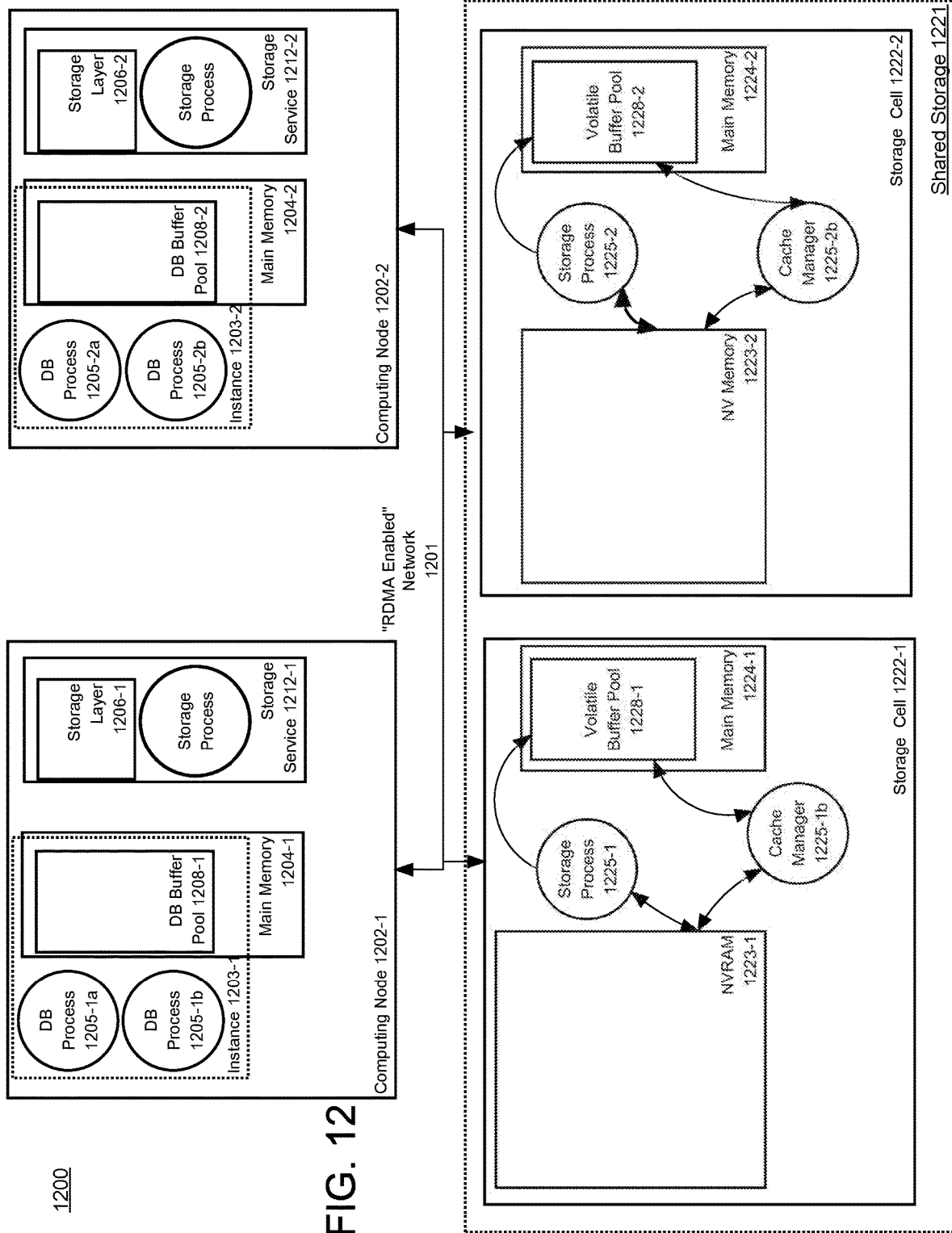
FIG. 12 illustrates a DBMS using a NVRAM-based shared storage structure where the primary storage for data blocks comprises NVRAM of storage cells according to an embodiment of the present invention.

FIG. 12 is a block diagram that illustrates such a NVRAM shared storage architecture. Referring to FIG. 12, multi-node DBMS 1200 comprises database server instances, each hosted on a respective computing node, each database server instance providing access to the same database stored on shared storage 1221. The database server instances of DBMS 1200 comprise database server instances 1203-1 and 1203-2, which are hosted on computing nodes 1202-1 and 1202-2 respectively. The shared storage 1221 comprises storage cells 1222-1 and 1222-2. Each of database server instances 1203-1 and 1203-2 is connected by a high speed network 1201 to each of storage cells 1222-1 and 1222-2.

Each of storage cells 1222-1 and 1222-2 is a computing node that includes main memory and persistent storage for storing database files of the one or more databases of DBMS 1200; in an embodiment, the persistent storage for storing database files comprises NVRAM. Home locations for database files and the data blocks therein of DBMS 1200 are in NVRAM 1223-1 and NVRAM 1223-2. The persistent storage of storage cells 1222-1 and 1222-2 may also comprise persistent storage devices such as disk devices or flash memory devices.

Storage process 1225-1 and storage process 1225-2 are storage processes that run on storage cells 1222-1 and 1222-2, respectively. Storage process 1225-1 and storage process 1225-2 receive requests from any of database server instances 1203-1 and 1203-2 to read or write data blocks from or to database files stored in NVRAM 1223-1 and 1223-2, or other persistent storage.

Among the requests handled by storage process 1225-1 and process 1225-2 are filtered data block requests. While storage process 1225-1 and storage process 1225-2 handle filtered data block requests, storage process 1225-1 and storage process 1225-2 are not able to compile database language statements into execution plans that can be executed against a database that is stored across storage cells in share storage 1221.

Volatile buffer pool 1228-1 and volatile buffer pool 1228-2 are buffer pools allocated from main memory 1224-1 and main memory 1224-2, respectively. Volatile buffer pool 1228-1 and volatile buffer pool 1228-2 each comprises buffers and each is used for temporarily staging and/or caching of data blocks stored in NVRAM 1223-1 and NVRAM 1223-2 when needed.

Cache manager 1225-1*b* is a process responsible for performing cache management for volatile buffer pool 1228-1 and cache manager 1225-2*b* is a process for performing cache management of volatile buffer pool 1228-2.

Database Server Instances

Each of the database server instances of DBMS 1200 comprises database processes that run on the computing node that hosts the database server instance. Referring to FIG. 12, each of database server instances 1203-1 and 1203-2 comprise multiple database processes and database buffers that cache data blocks read from shared storage 1221. Database server instances 1203-1 and 1203-2 are hosted on computing nodes 1202-1 and 1202-2, respectively. Database server instance 1203-1 comprises DB processes 1205-1*a* and 1205-1*b*, which run on computing node 1202-1, and database buffer pool 1208-1, which is allocated from main memory 1204-1. Database server instance 1203-2 comprises database processes 1205-2*a* and 1205-2*b*, which run on computing node 1202-2, and database buffer pool 1208-2, which is allocated from main memory 1204-2.

Network 1201 is RDMA enabled, enabling a process running a computing node 1202-1 or computing node 1202-2 to read and write using RDMA from or to NVRAM 1223-1 and NVRAM 1223-2, main memory 1224-1 and main memory 1224-2.

According to an embodiment, each computing node of DBMS 1200 hosts a storage service. Referring to FIG. 12, computing node 1202-1 hosts storage service 1212-1 and computing node 1202-2 hosts storage service 1212-2. Storage service 1212-1 comprises one or more storage processes and storage layer 1206-1. Storage service 1212-2 comprises one or more storage processes and storage layer 1206-2. Storage service 1212-1 and storage service 1212-2 provide a mapping between database files and offsets therein to home locations of data blocks within the database files in NVRAM.

Operations such as a one-sided writes, a data block read operation, one-sided writing, one-sided writes for append-only are performed similarly as described before as follows. Home locations for data blocks are at the NVRAM of storage cells. RDMA writes of data blocks to home locations are made to the NVRAM of storage cells. The storage cells also include NVRAM allocated for write staging buffers.

In an embodiment, a NVRAM shared storage architecture may comprise a database with database files having home locations across the NVRAM of storage cells and the computing nodes of database server instances. Operations such as a one-sided writes, a data block read operation, one-sided writing, one-sided writing for append-only are performed similarly as described before except as follows. Home locations for data blocks include the NVRAM of storage cells and computing nodes of database server instances. RDMA writes of data blocks to home locations are made to the NVRAM of storage cells and computing nodes of database server instances.

Memory Overview

Because embodiments of the invention involve a novel use of a non-volatile RAM, a description of memory is pertinent and useful. As used herein, "non-volatile" refers to a characteristic of a memory that retains data in the absence of any form of electrical power, including external or battery backup. Examples of non-volatile memory include e-prom memory, flash memory, and disk memory. Non-volatile memory does not include volatile memory for which power is retained by a battery backup in the absence of another external power source. For example, volatile memory coupled to a board with an embedded battery-backup is not non-volatile memory, because without the power provided by a battery, the volatile memory does not retain data.

Byte-addressable memory is distinguishable from block-addressable memory. A byte is eight bits and is the minimum amount of data that may be addressed, retrieved from memory, or written to in byte-addressable memory. Thus, to manipulate a bit in a byte, a byte containing the bit must be fetched to a register of processor executing a machine instruction that references the byte (or word containing the byte) and manipulated according to the machine instruction or another machine instruction.

In contrast, the minimum size for a unit of block-addressable memory is a data block. A data block comprises multiple bytes and multiple words and cannot be entirely stored within a register of processor. For block-addressable memory, a data block is the minimum amount of data that may be addressed, retrieved from memory, or written to memory. Examples of block-addressable memory include flash memory and disk memory. To manipulate a bit or a byte in a block, a block containing those bits is loaded into a byte-addressable memory by an instruction referencing the block issued to a block-based interface.

RAM is distinguishable from read-only memory (ROM) in that data in RAM can be overwritten. As used herein, overwriting data refers to replacing the data with new data without first having to erase the data in the memory. Thus, as used herein, RAM refers to byte-addressable memory that can be overwritten.

DBMS Overview

A DBMS manages one or more databases. A DBMS may comprise one or more database servers referred to herein as database server instances. A database comprises database data and a database dictionary that are stored on a persistent memory mechanism. Database data may be stored in one or more data containers. Each container contains records. The data within each record is organized into one or more fields. In relational DBMS's, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server instance of a DBMS by submitting to the database server commands that cause the database server instance to perform operations on data stored in a database, as well as other kinds of operations. A database command may be in the form of a database statement that conforms to a database language. A database language for expressing the database commands is the Structured Query Language (SQL). There are many different versions of SQL, some versions are standard and some proprietary, and there are a variety of extensions. Data definition language commands are issued to a database server to create or configure database objects, such as tables, views, or complex data types. DDL commands are used to configure a database server for a particular hardware environment, to configure computer resource usage of the database server, as well as other operating aspects of the database server.

A server, such as a database server, is a combination of software and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to as a "server instance" or "instance." A database server may comprise multiple database server instances, some or all of which are running on separate computer elements.

Database processes that comprise a database server run under the control of the database server (i.e. can be created or terminated by the database server) and perform various database server functions. Such processes are referred to herein as database processes. Database processors include listeners, garbage collectors, log writers, processes for database sessions for executing database commands issued by database clients (including processes executing within shared sessions), and recovery processes.

A database process may comprise state objects that indicate state information for the process and allows the DBMS to manage and track the process. A typical database thread may also comprise a state object. A state object is a resource that is visible to the DBMS and indicates to the DBMS the state of the process. For example, a state object may indicate whether a process is free, unavailable, or failed. Thus, the DBMS can use the state object to determine how many processes are running in the database system, which ones are available, and clean up failed processes.

In an embodiment, the DBMS comprises a resource manager, which handles database processes for the database system. The resource manager may be a background daemon, a database component, software module, or some combination thereof. The resource manager may monitor database instance(s) and track processor and I/O resources across database processes. In an embodiment, the resource manager is a process scheduler that interrupts, de-schedules, schedules, or otherwise controls when database processes may run.

In an embodiment, state objects are used by the resource manager to track the current state of database processes. As used herein, a state can include information regarding a database process, login credentials for a database session, current database transactions, and resources held by a process or thread. Examples of state objects include process, session, and call state objects. Process state objects keep a process' information, attributes (such as dead, system process, fatal system process, cleanup process, shared server, and etc.), and other process structures such as a process interrupt queue.

Data Blocks

A data block is used by a DBMS to store one or row more database rows, or portions of rows, including one or more columns of a row. When rows are read from persistent storage, a data block containing the row is copied into a data block buffer in RAM and/or main memory of a database server. A data block that is used to store database data maybe referred to herein as a database block. A database block usually contains multiple rows, and database block metadata describing the contents of the database block. Metadata includes control and formatting information, such as offsets to sequences of bytes representing rows or other data structures, and a list of transactions affecting a row.

A database block is referred to as being atomic because, at least in part, a database block is the smallest unit of database data a database server may request from a persistent storage device. For example, when a database server seeks a row that is stored in a data block, the data block may only read the row from a persistent storage device by reading in the entire data block.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
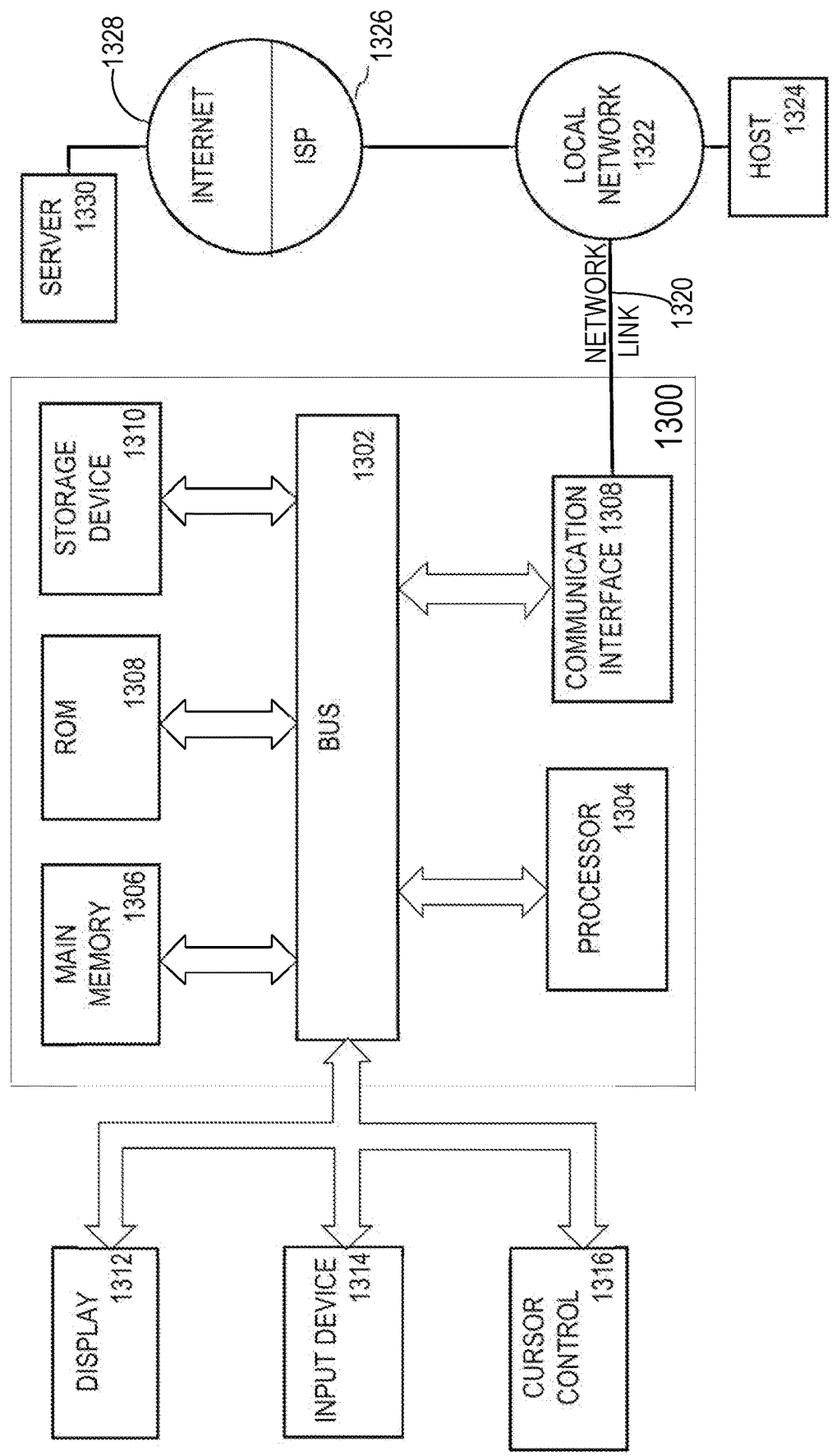
FIG. 13 is a diagram of a computer system on which embodiments may be implemented.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 14:
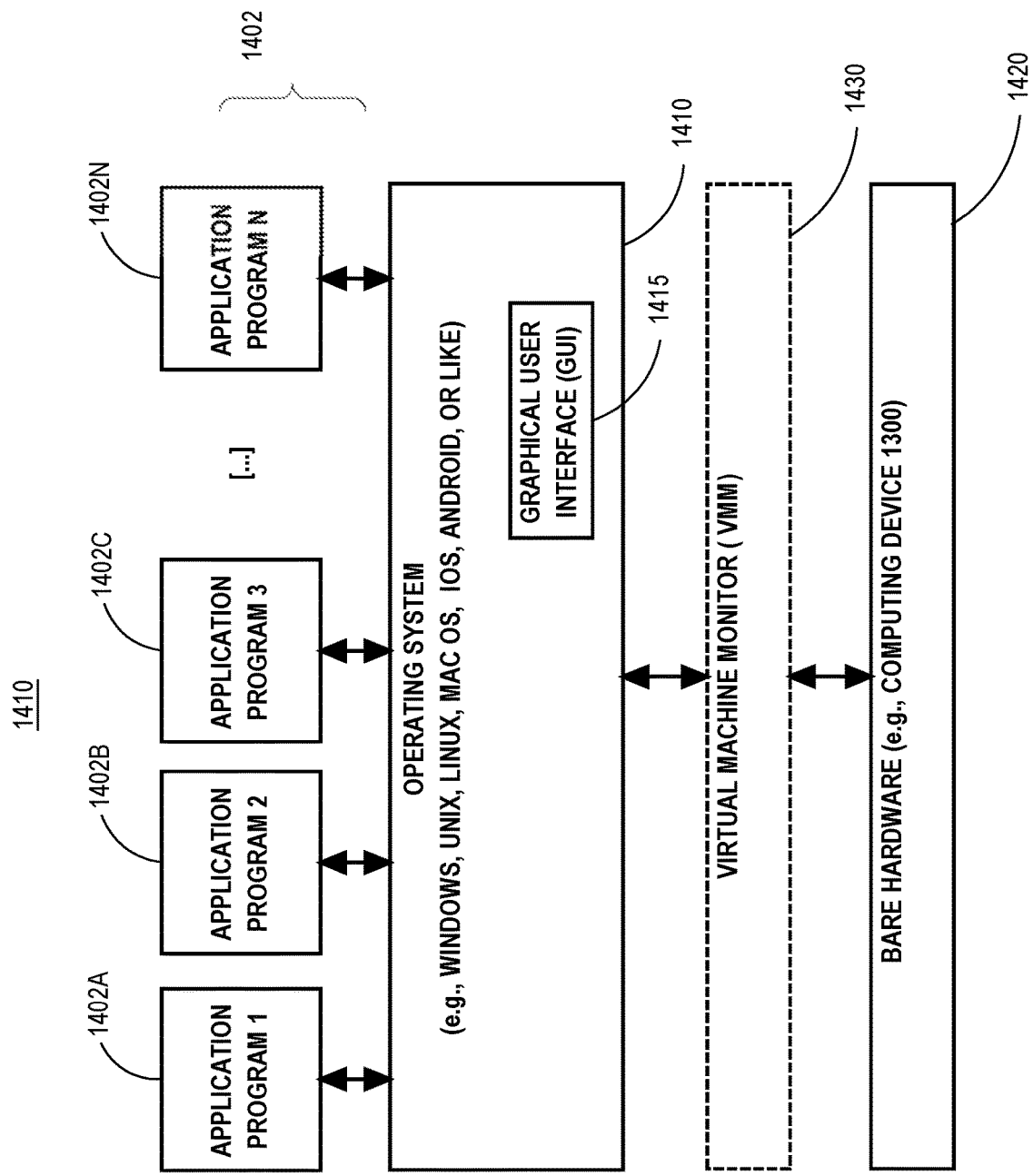
FIG. 14 is a diagram of a software system that may be employed for controlling the operation of a computer system according to an embodiment of the present invention.

FIG. 14 is a block diagram of a basic software system 1400 that may be employed for controlling the operation of computer system 1300. Software system 1400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1400 is provided for directing the operation of computer system 1300. Software system 1400, which may be stored in system memory (RAM) 1306 and on fixed storage (e.g., hard disk or flash memory) 1310, includes a kernel or operating system (OS) 1410.

The OS 1410 manages low-level aspects of computer operation, including managing execution of processes, memory allocation, file input and output (I/O), and device I/O. One or more application programs, represented as 1402A, 1402B, 1402C . . . 1402N, may be "loaded" (e.g., transferred from fixed storage 1310 into memory 1306) for execution by the system 1400. The applications or other software intended for use on computer system 1300 may also be stored as a set of downloadable computer-executable instructions, for example, for downloading and installation from an Internet location (e.g., a Web server, an app store, or other online service).

Software system 1400 includes a graphical user interface (GUI) 1415, for receiving user commands and data in a graphical (e.g., "point-and-click" or "touch gesture") fashion. These inputs, in turn, may be acted upon by the system 1400 in accordance with instructions from operating system 1410 and/or application(s) 1402. The GUI 1415 also serves to display the results of operation from the OS 1410 and application(s) 1402, whereupon the user may supply additional inputs or terminate the session (e.g., log off).

OS 1410 can execute directly on the bare hardware 1420 (e.g., processor(s) 1304) of computer system 1300. Alternatively, a hypervisor or virtual machine monitor (VMM) 1430 may be interposed between the bare hardware 1420 and the OS 1410. In this configuration, VMM 1430 acts as a software "cushion" or virtualization layer between the OS 1410 and the bare hardware 1420 of the computer system 1300.

VMM 1430 instantiates and runs one or more virtual machine instances ("guest machines"). Each guest machine comprises a "guest" operating system, such as OS 1410, and one or more applications, such as application(s) 1402, designed to execute on the guest operating system. The VMM 1430 presents the guest operating systems with a virtual operating platform and manages the execution of the guest operating systems.

In some instances, the VMM 1430 may allow a guest operating system to run as if it is running on the bare hardware 1420 of computer system 1300 directly. In these instances, the same version of the guest operating system configured to execute on the bare hardware 1420 directly may also execute on VMM 1430 without modification or reconfiguration. In other words, VMM 1430 may provide full hardware and CPU virtualization to a guest operating system in some instances.

In other instances, a guest operating system may be specially designed or configured to execute on VMM 1430 for efficiency. In these instances, the guest operating system is "aware" that it executes on a virtual machine monitor. In other words, VMM 1430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

EXTENSIONS AND ALTERNATIVES

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
    storing a database in a plurality of database files in non-volatile random access memory (NVRAM), of a plurality of computing nodes in a multi-node database management system (DBMS), each computing node of said plurality of computing nodes hosting a database server instance;
    wherein each computing node of said plurality of computing nodes comprises NVRAM and stores a respective subset of said plurality of database files in the NVRAM of said each computing node;
    a database process on a first computing node of said plurality of computing nodes executing a query, wherein executing said query comprises:
        determining that a first data block is stored in the NVRAM of a second computing node of said plurality of computing nodes;
        issuing a RDMA read request to a first RDMA hardware mechanism on said first computing node to read said first data block from the NVRAM of the second computing node;
        a second RDMA hardware mechanism on said second computing node retrieving said first data block from said NVRAM and transmitting said first data block to said first RDMA hardware mechanism;
        said first RDMA hardware mechanism storing said first data block in a database buffer of pool of database buffers on said first computing node.

2. The method of claim 1, wherein:
    the method includes each computing node of said plurality of computing nodes storing mapping data that maps a plurality of database tables of said data database to storage locations within the NVRAM of said plurality of said computing nodes, said storage locations storing data for said plurality of database tables;
    wherein for said first computing node of said plurality of computing nodes, the mapping data stored on said first computing node maps a first database table to a storage location within the NVRAM of said second computing node;
    wherein determining that a first data block is stored in the NVRAM of said second computing node includes examining the mapping data stored on said first computing node to determine that a storage location of said first data block is at the NVRAM of said second computing node.

3. The method of claim 1, wherein:
    the method includes each computing node of said plurality of computing nodes storing mapping data that maps a plurality of database tables of said database to storage locations within the NVRAM of said plurality of said computing nodes, said storage locations storing data for said plurality of database tables;
    said first data block stores data for a first database table of said plurality of database tables;
    wherein the mapping data stored on said first computing node comprises first mapping data;
    wherein said first mapping data maps as a primary storage location of a first portion of data for said first database table to a storage location in the NVRAM of said second computing node;
    wherein determining that a first data block is stored in the NVRAM of said second computing node includes examining the mapping data stored on said first computing node to determine that said primary storage location of said first data block is at the NVRAM of said second computing node.

4. The method of claim 3,
    wherein said first mapping data maps as a secondary storage location of a second portion of data for said first database table to a storage location at the NVRAM of said first computing node;
    wherein said first database process executing said query includes:
        based on the first mapping data, determining that a secondary storage location of a second data block is at the NVRAM of said first computing node;
        reading said second data block from the NVRAM of said first computing node;
        storing said second data block in said database buffer of pool of database buffers on said first computing node.

5. The method of claim 1, further including:
    each computing node of said plurality of computing nodes running a storage server process that responds to filtered data block requests by returning only data blocks that contain at least one row that satisfies one or more filtering criteria specified by said filtered data block requests;
    wherein a database process on a first computing node of said plurality of computing nodes executing a query comprises:
        said database process on said first computing node sending a first filtered data block request to a storage server process on said second computing node, said first filtered data block request identifying data blocks stored in the NVRAM of said second computing node; and
        the storage server process on said second computing node returning data blocks that satisfy one or more filtering criteria specified by said filtered data block request.

6. The method of claim 5, wherein:
    a database process on a first computing node of said plurality of computing nodes executing a query comprises said database process on said first computing node sending a second filtered data block request to a second storage server process on said first computing node, said second filtered data block request identifying data blocks stored in the NVRAM of said first computing node;
    the method further comprises said second storage server process on said first computing node returning data blocks that satisfy one or more filtering criteria specified by said second filtered data block request.

7. The method of claim 5, wherein the method further comprises:
    said second computing node loading a particular data block from the NVRAM of said second computing node to a database buffer in volatile RAM of said second computing node;

said second computing node examining said particular data block in said database buffer to determine whether any row in said particular data block satisfies the one or more filtering criteria specified by said first filtered data block request.

8. The method of claim 5, wherein the method further comprises:
said second computing node examining a particular data block in-place in said NVRAM of said second computing node to determine whether any row in said particular data block satisfies the one or more filtering criteria specified by said first filtered data block request.

9. The method of claim 1, wherein database files of said plurality of database files are stored in the NVRAM of said first computing node in non-interleaved mode.

10. The method of claim 1, wherein executing said query further comprises:
determining that a particular data block is stored in the NVRAM of a storage cell;
issuing a RDMA read request to the first RDMA hardware mechanism on said first computing node to read said particular data block from the NVRAM of the storage cell; and
a particular RDMA hardware mechanism on said storage cell retrieving said particular data block from said NVRAM of said storage cell and transmitting said particular data block to said first RDMA hardware mechanism.

11. One or more non-transitory computer-readable media storing sequences of instructions that, when executed by one or more processors, cause:
storing a database in a plurality of database files in non-volatile random access memory (NVRAM) of a plurality of computing nodes in a multi-node database management system (DBMS), each computing node of said plurality of computing nodes hosting a database server instance;
wherein each computing node of said plurality of computing nodes comprises NVRAM and stores a respective subset of said plurality of database files in the NVRAM of said each computing node;
a database process on a first computing node of said plurality of computing nodes executing a query, wherein executing said query comprises:
determining that a first data block is stored in the NVRAM of a second computing node of said plurality of computing nodes;
issuing a RDMA read request to a first RDMA hardware mechanism on said first computing node to read said first data block from the NVRAM of the second computing node;
a second RDMA hardware mechanism on said second computing node retrieving said first data block from said NVRAM and transmitting said first data block to said first RDMA hardware mechanism;
said first RDMA hardware mechanism storing said first data block in a database buffer of pool of database buffers on said first computing node.

12. The one or more non-transitory computer-readable media of claim 11, Wherein:
the sequences of instructions include instructions that, when executed by said one or more processors, cause each computing node of said plurality of computing nodes storing mapping data that maps a plurality of database tables of said data database to storage locations within the NVRAM of said plurality of said computing nodes, said storage locations storing data for said plurality of database tables;
wherein for said first computing node of said plurality of computing nodes, the mapping data stored on said first computing node maps a first database table to a storage location within the NVRAM of said second computing node;
wherein determining that a first data block is stored in the NVRAM of said second computing node includes examining the mapping data stored on said first computing node to determine that a storage location of said first data block is at the NVRAM of said second comp in computing node.

13. The one or more non-transitory computer-readable media of claim 11, wherein:
the sequences of instructions include instructions that, when executed by said one or more processors, cause each computing node of said plurality of computing nodes storing mapping data that maps a plurality of database tables of said database to storage locations within the NVRAM of said plurality of said computing nodes, said storage locations storing data for said plurality of database tables;
said first data block stores data for a first database table of said plurality of database tables;
wherein the mapping data stored on said first computing node comprises first mapping data;
wherein said first mapping data maps as a primary storage location of a first portion of data for said first database table to a storage location in the NVRAM of said second computing node;
wherein determining that a first data block is stored in the NVRAM of said second computing node includes examining the mapping data stored on said first computing node to determine that said primary storage location of said first data block is at the NVRAM of said second computing node.

14. The one or more non-transitory computer-readable media of claim 13,
wherein said first mapping data maps as a secondary storage location of a second portion of data for said first database table to a storage location at the NVRAM of said first computing node;
wherein said first database process executing said query includes:
based on the first mapping data, determining that a secondary storage location of a second data block is at the NVRAM of said first computing node;
reading said second data block from the NVRAM of said first computing node;
storing said second data block in said database buffer of pool of database buffers on said first computing node.

15. The one or more non-transitory computer-readable media of claim 11, wherein:
the sequences of instructions include instructions that, when executed by said one or more processors, cause each computing node of said plurality of computing nodes running a storage server process that responds to filtered data block requests by returning only data blocks that contain at least one row that satisfies one or more filtering criteria specified by said filtered data block requests;
wherein a database process on a first computing node of said plurality of computing nodes executing a query comprises:

said database process on said first computing node sending a first filtered data block request to a storage server process on said second computing node, said first filtered data block request identifying data blocks stored in the NVRAM of said second computing node; and the sequences of instructions include instructions that, when executed by said one or more processors, cause the storage server process on said second computing node returning data blocks that satisfy one or more filtering criteria specified by said filtered data block request.

16. The one or more non-transitory computer-readable media of claim 15, wherein:

a database process on a first computing node of said plurality of computing nodes executing a query comprises:

said database process on said first computing node sending a second filtered data block request to a second storage server process on said first computing node, said second filtered data block request identifying data blocks stored in the NVRAM of said first computing node;

the sequences of instructions include instructions that, when executed by said one or more processors, cause said second storage server process on said first computing node returning data blocks that satisfy one or more filtering criteria specified by said second filtered data block request.

17. The one or more non-transitory computer-readable media of claim 15, the sequences of instructions include instructions that, when executed by said one or more processors, cause:

said second computing node loading a particular data block from the NVRAM of said second computing node to a database buffer in volatile RAM of said second computing node;

said second computing node examining said particular data block in said database buffer to determine whether any row in said particular data block satisfies the one or more filtering criteria specified by said first filtered data block request.

18. The one or more non-transitory computer-readable media of claim 15, the sequences of instructions include instructions that, when executed by said one or more processors, cause said second computing node examining a particular data block in-place in said NVRAM of said second computing node to determine whether any row in said particular data block satisfies the one or more filtering criteria specified by said first filtered data block request.

19. The one or more non-transitory computer-readable media of claim 11, wherein database files of said plurality of database files are stored in the NVRAM of said first computing node in non-interleaved mode.

20. The one or more non-transitory computer-readable media of claim 11, wherein executing said query comprises:

determining that a particular data block is stored in the NVRAM of a storage cell;

issuing a RDMA read request to the first RDMA hardware mechanism on said first computing node to read said particular data block from the NVRAM of the storage cell; and a particular RDMA hardware mechanism on said storage cell retrieving said particular data block from said NVRAM of said storage cell and transmitting said particular data block to said first RDMA hardware mechanism.

* * * * *

UNITED STATES PATENT AND TRADEMARK OFFICE
CERTIFICATE OF CORRECTION

PATENT NO. : 10,802,766 B2
APPLICATION NO. : 15/720959
DATED : October 13, 2020
INVENTOR(S) : Choudhury et al.

It is certified that error appears in the above-identified patent and that said Letters Patent is hereby corrected as shown below:

On the Title Page

Column 2, item (57) under Abstract, Line 15, delete "("RDMA)." and insert -- ("RDMA"). --, therefor.

On page 4, Column 1, under Other Publications, Line 23, delete "Hasing"," and insert -- Hashing", --, therefor.

On page 4, Column 1, under Other Publications, Line 39, delete "SIGVOMM," and insert -- SIGCOMM, --, therefor.

On page 4, Column 1, under Other Publications, Line 58, delete ""Fundatrnentals" and insert -- "Fundamentals --, therefor.

In the Specification

In Column 1, Line 17, delete "STRONG" and insert -- STORING --, therefor.

In the Claims

In Column 25, Line 15, in Claim 1, delete "(NVRAM)," and insert -- (NVRAM) --, therefor.

In Column 26, Line 38, in Claim 5, delete "comprises:" and insert -- comprises --, therefor.

In Column 27, Line 61, in Claim 12, delete "Wherein:" and insert -- wherein: --, therefor.

In Column 28, Lines 13-14, in Claim 12, after "second" delete "comp in".

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*

In Column 28, Line 67, in Claim 15, delete "comprises:" and insert -- comprises --, therefor.

In Column 29, Lines 17-18, in Claim 16, delete "comprises:" and insert -- comprises --, therefor.